US009122340B2

(12) United States Patent
Jung et al.

(10) Patent No.: US 9,122,340 B2
(45) Date of Patent: Sep. 1, 2015

(54) MOBILE TERMINAL AND METHOD OF CONTROLLING THE SAME

(71) Applicant: LG ELECTRONICS INC., Seoul (KR)

(72) Inventors: Jaehun Jung, Seoul (KR); Sanggil Han, Seoul (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 13/953,021

(22) Filed: Jul. 29, 2013

(65) Prior Publication Data

US 2014/0160010 A1    Jun. 12, 2014

(30) Foreign Application Priority Data

Dec. 11, 2012    (KR) ........................ 10-2012-0143710

(51) Int. Cl.
*G06F 3/01*        (2006.01)
*G06F 3/041*       (2006.01)
*G06F 3/0488*      (2013.01)

(52) U.S. Cl.
CPC .......... *G06F 3/0414* (2013.01); *G06F 3/04883* (2013.01); *G06F 2203/0339* (2013.01); *G06F 2203/0381* (2013.01)

(58) Field of Classification Search
None
See application file for complete search history.

(56) References Cited

U.S. PATENT DOCUMENTS

| 2006/0197750 | A1* | 9/2006 | Kerr et al. ..................... 345/173 |
| 2010/0214243 | A1* | 8/2010 | Birnbaum et al. ............ 345/173 |
| 2011/0069024 | A1* | 3/2011 | Kim .............................. 345/173 |
| 2012/0147052 | A1* | 6/2012 | Homma et al. ............... 345/660 |

* cited by examiner

*Primary Examiner* — Joseph Haley
*Assistant Examiner* — Emily Frank
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a body provided with a front surface, a rear surface and a lateral surface; a display unit disposed on at least the front surface and configured to display screen information; a squeeze sensing unit configured to sense a pressure applied to the body to detect a squeeze operation; and a controller configured to receive a control command for controlling a preset first operation of the mobile terminal, perform the first preset operation based on receiving only the control command and not detecting the squeeze operation, and perform a second preset operation different than the first preset operation based on receiving both the received control command and the detected squeeze operation.

18 Claims, 24 Drawing Sheets

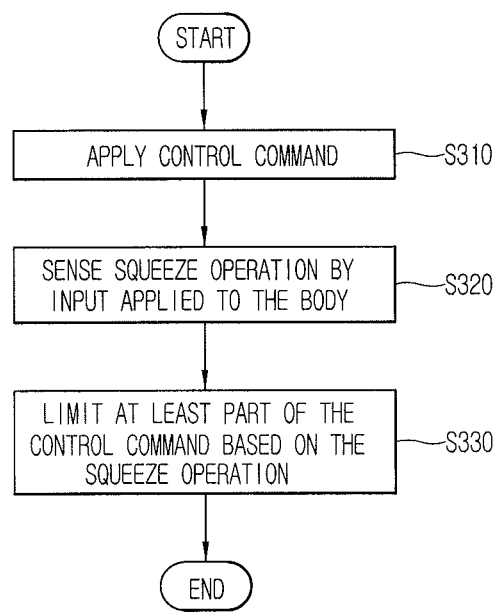

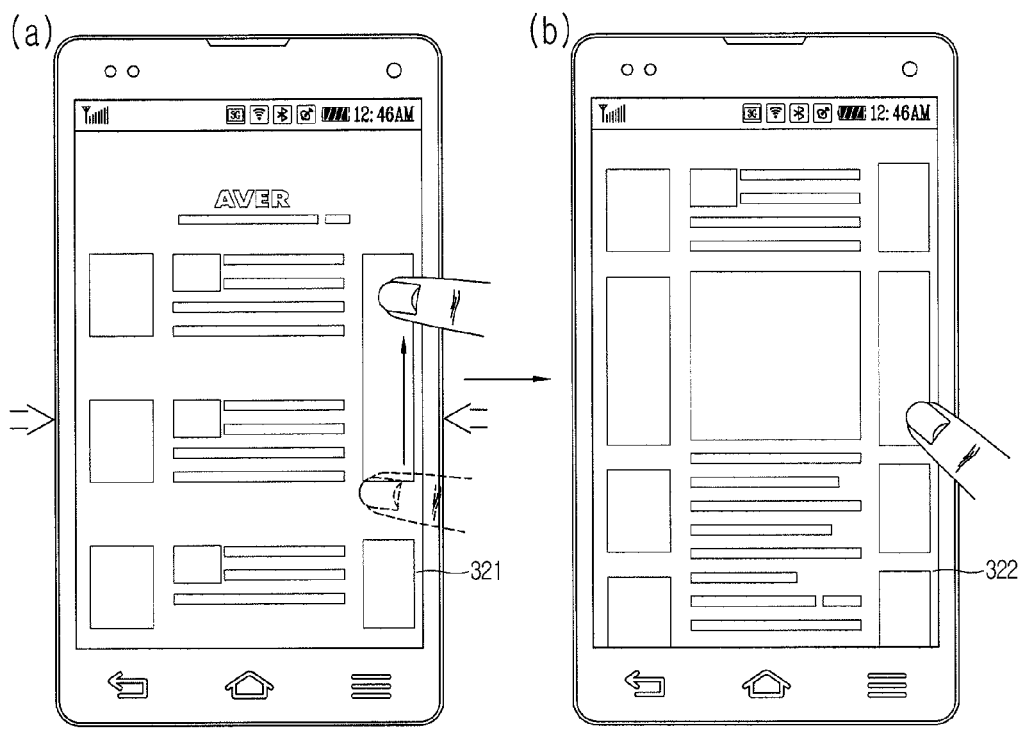

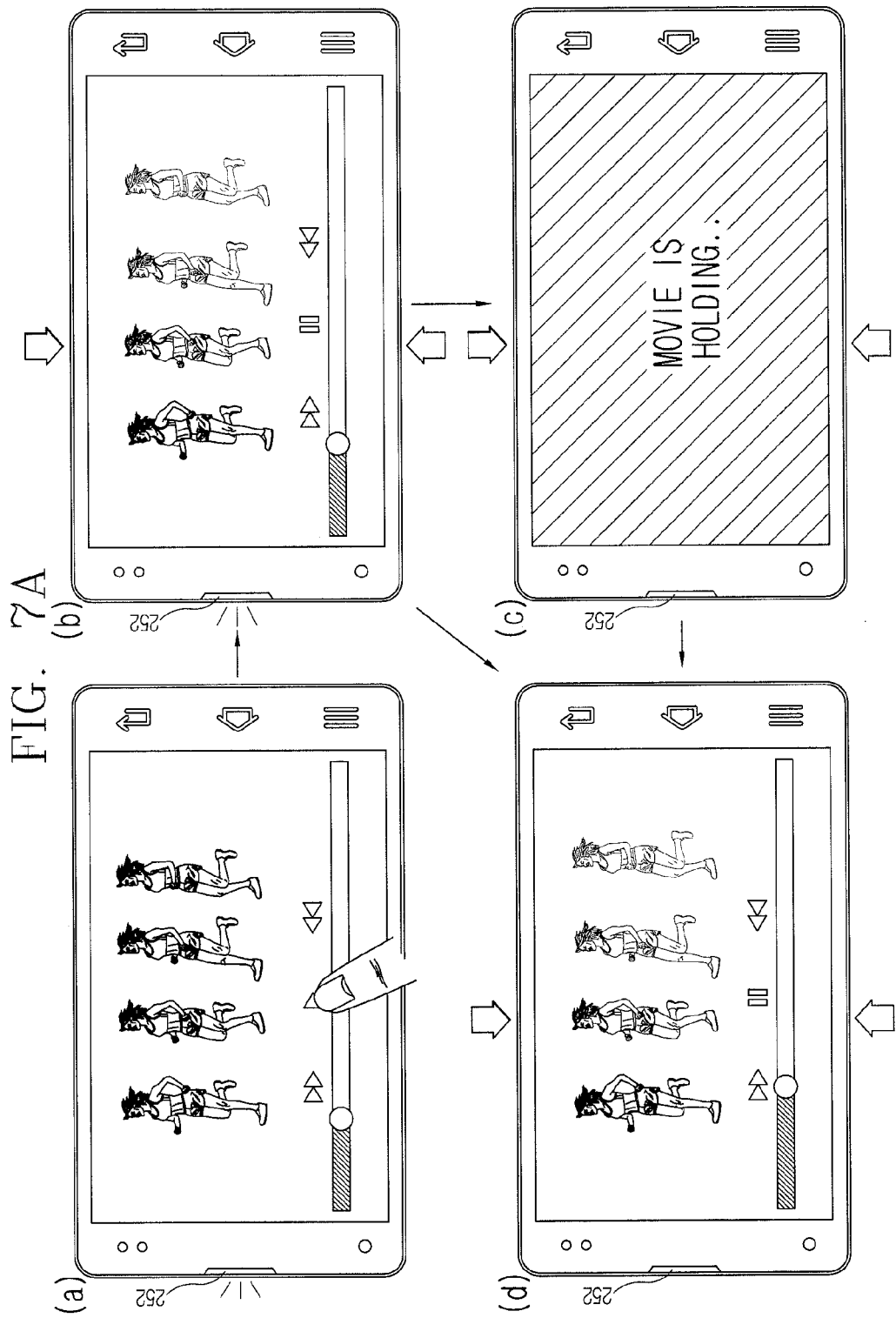

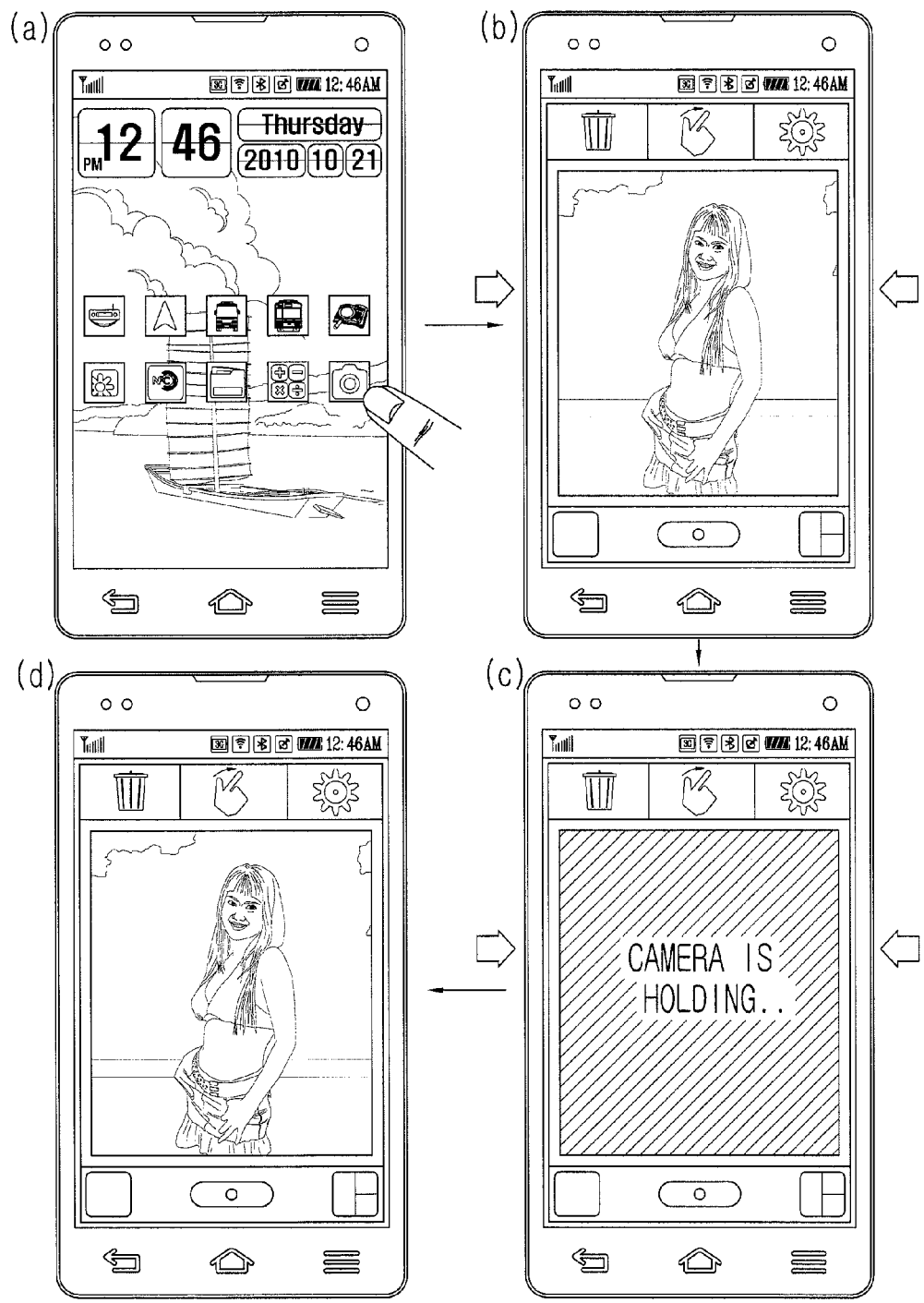

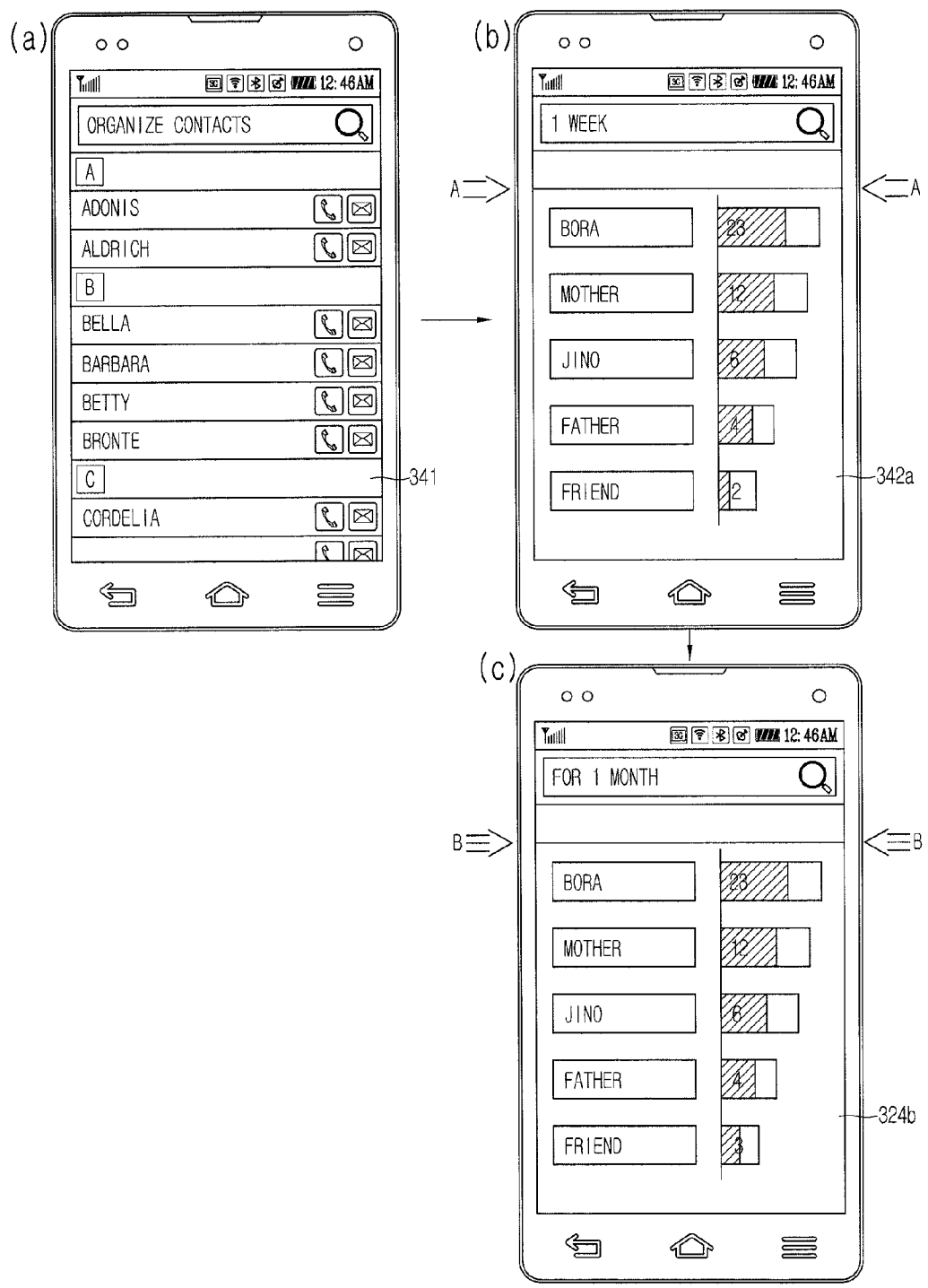

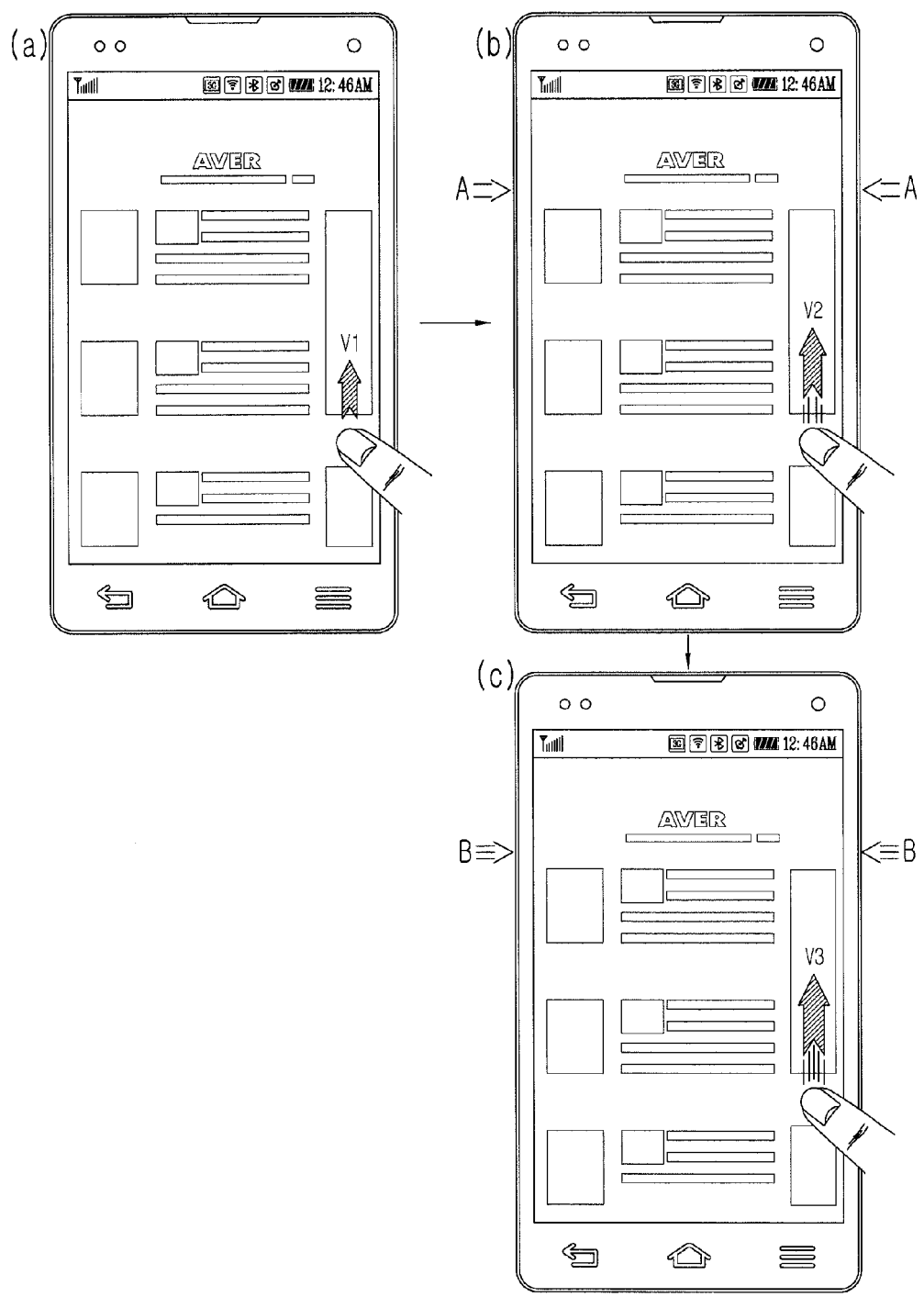

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2012-0143710, filed in filed in Republic of Korea on Dec. 11, 2012, the contents of which are incorporated by reference herein in its entirety.

BACKGROUND OF THE INVENTION

1. Field of the Invention

The present invention relates to a mobile terminal, and more particularly, to a mobile terminal having a squeeze sensing unit and a method of controlling the same.

2. Description of the Related Art

Terminals can be classified into a mobile/portable terminal and a stationary terminal. A mobile terminal can be further classified into a handheld terminal and a vehicle mounted terminal.

As it becomes multifunctional, such a terminal can capture still images or moving images, play music or video files, play games, receive broadcasts and the like, so as to be implemented as an integrated multimedia player.

Various new attempts have been made for the multimedia devices in the aspect of hardware or software in order to implement such complicated functions. For example, a user interface environment is provided in order for users to easily and conveniently retrieve or select functions.

Also, many users want their mobile terminals to express their own personalities, and accordingly, various designs are required for the mobile terminal. Such designs may also include structural changes and improvements for the user to more conveniently use the mobile terminal.

Owing to the improvements, the user can generate an input signal using a touch sensor provided in the display unit of the terminal. However, the related terminal has a problem in that a control command is applied to the display unit by an unintentionally applied touch input when the display unit is activated.

SUMMARY OF THE INVENTION

Accordingly, one object of the present invention is to provide a mobile terminal for changing a control command entered to the mobile terminal based on a squeeze operation.

In order to accomplish the foregoing task of the present invention, the mobile terminal may include a body provided with a front surface, a rear surface and a lateral surface, an input unit configured to receive a control command controlling the operation of the mobile terminal, a squeeze sensing unit configured to sense a pressure applied to the body to detect a squeeze operation, and a controller configured to limit part of the operation due to the received control command based on the squeeze operation detected by the squeeze sensing unit.

As an example associated with the present invention, the input unit may include a display unit to which a plurality of touch inputs formed with different gestures are applied to generate the plurality of different control commands, and the controller may control the display unit to limit at least one generation of the control commands based on the squeeze operation.

As an example associated with the present invention, the display unit may display screen information containing at least one content, and the plurality of touch inputs may include a first touch for generating a control command selecting the content and a second touch for generating a control command scrolling the screen information, and the controller may control the display unit to limit the generation of a control command selecting content based on the first touch on the basis of the squeeze operation.

As an example associated with the present invention, the display unit may display an execution screen of the implemented application, and the controller may control the display unit to switch the execution screen to another screen information when a touch input is applied to the display unit and control the mobile terminal to limit the termination of the application based on the squeeze operation.

As an example associated with the present invention, the controller may control the display unit to switch the screen information to the execution screen when the squeeze operation is sensed again.

As an example associated with the present invention, the squeeze sensing unit may sense a pressure continuously applied to the body as the squeeze operation, and the controller may control the display unit to switch the screen information to the execution screen when the pressure is released.

As an example associated with the present invention, the squeeze sensing unit may sense the level of a pressure applied to the body, and the controller may control the mobile terminal to execute different operations according to the level of the pressure.

As an example associated with the present invention, the input unit further may include a display unit configured to display screen information and receive a touch input for switching the screen information, and the controller may control the display unit to switch the screen information at a different speed according to the touch input based on the level of the pressure.

As an example associated with the present invention, the input unit may include a display unit configured to display screen information containing at least one content, and the controller may control the display unit to display at least part of the content based on preset criteria according to the level of the pressure.

As an example associated with the present invention, the controller may control the mobile terminal to terminate the application being executed when a squeeze operation according to the level of a preset pressure is sensed on the body.

As an example associated with the present invention, the mobile terminal may further include a memory configured to memorize a plurality of screen information when a squeeze operation according to the level of a different pressure is sensed, wherein the controller controls the display unit to display screen information corresponding to the squeeze operation among a plurality of screen information stored in the memory when a squeeze operation based on the level of a specific pressure applied to the body is sensed.

As an example associated with the present invention, when the squeeze operation is sensed in a state that a touch input selecting one region of the screen information on the display unit is applied, the controller may control the memory to store part of the screen information corresponding to the one region.

As an example associated with the present invention, when the squeeze operation is sensed again in a state that screen information different from the screen information is displayed on the display unit, the controller may control the display unit to display one region of the screen information to be overlapped with the different screen information.

In order to accomplish the foregoing task of the present invention, a control method of a mobile terminal may include applying a control command controlling a preset operation of the mobile terminal, applying a pressure to the mobile terminal body, sensing a squeeze operation by the pressure, and limiting at least part of the operation based on the squeeze operation.

As an example associated with the present invention, said applying a control command controlling a preset operation of the mobile terminal may include applying a touch input containing a different gesture generating a different control command to the display unit.

As an example associated with the present invention, the control command may control the display unit to terminate the application being executed, and switch the execution screen of the application to another screen.

As an example associated with the present invention, said limiting at least part of the operation based on the squeeze operation may include limiting the termination of the application being executed, and switching the execution screen to another screen.

As an example associated with the present invention, the method may include sensing the squeeze operation based on a pressure applied to the body, and displaying the execution screen on the display unit based on the squeeze operation.

As an example associated with the present invention, said sensing a squeeze operation by the pressure may include sensing the level of the pressure.

As an example associated with the present invention, the method may further include generating another control command controlling the operation of the mobile terminal based on the level of the pressure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a flow chart illustrating a control method of a mobile terminal according to an embodiment of the present invention;

FIGS. 6A through 6C are conceptual views illustrating a control method of FIG. 5 according to various embodiments;

FIGS. 7A and 7B are conceptual views illustrating a control method for limiting the function of the mobile terminal in an active state;

FIGS. 11A through 11C are conceptual views illustrating a control method of FIG. 10 according to an embodiment;

DETAILED DESCRIPTION OF THE INVENTION

Figure 1:
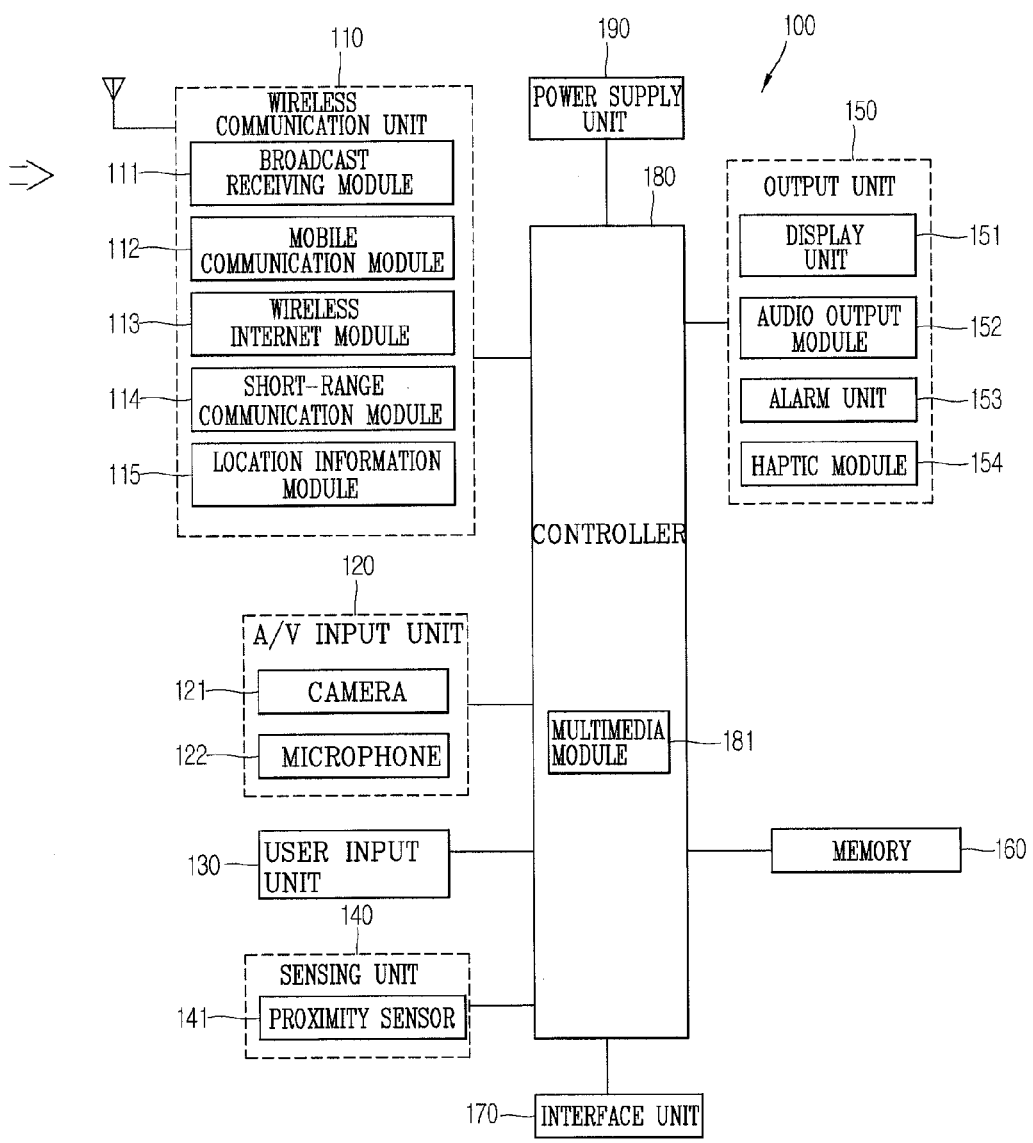
FIG. 1 is a block diagram illustrating a mobile terminal associated with an embodiment of the present invention.

Hereinafter, a mobile terminal associated with the present invention will be described in more detail with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

A mobile terminal disclosed herein may include a portable phone, a smart phone, a laptop computer, a digital broadcast terminal, personal digital assistants (PDA), a portable multimedia player (PMP), a navigation, and the like. However, a configuration disclosed herein may be applicable to a stationary terminal such as a digital TV, a desktop computer, and the like, excluding constituent elements particularly configured for mobile purposes.

As shown in FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the mobile terminal may be implemented with greater or less number of elements than those illustrated elements.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this instance, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

When the display unit 151 and a touch sensitive sensor (referred to as a "touch sensor") have an interlayer structure, the structure may be referred to as a "touch screen". The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signal(s) are transmitted to a touch controller. The touch controller processes the received signals, and then transmits corresponding data to the controller 180. Accordingly, the controller 180 may sense which region of the display unit 151 has been touched.

Referring to FIG. 1, the proximity sensor 141 may be arranged at an inner region of the portable terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm unit 153 outputs signals notifying occurrence of events from the portable terminal 100. The events occurring from the portable terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

The interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 can perform a pattern recognition processing so as to recognize writing or drawing input on the touch screen as text or image. Further, the power supply unit 190 provides power required by various components under the control of the controller 180.

Various embodiments described herein may be implemented in a computer-readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Figure 2A:
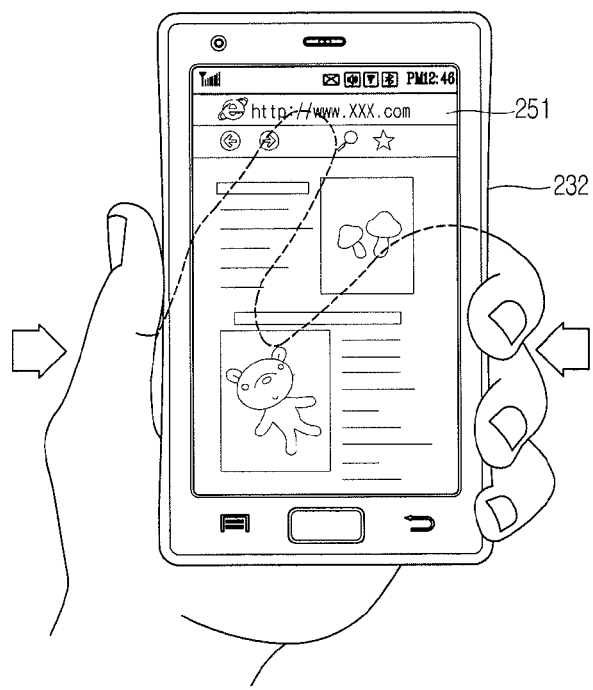
FIGS. 2A and 2B are front perspective view illustrating an example of a mobile terminal associated with the present invention.
Figure 2B:
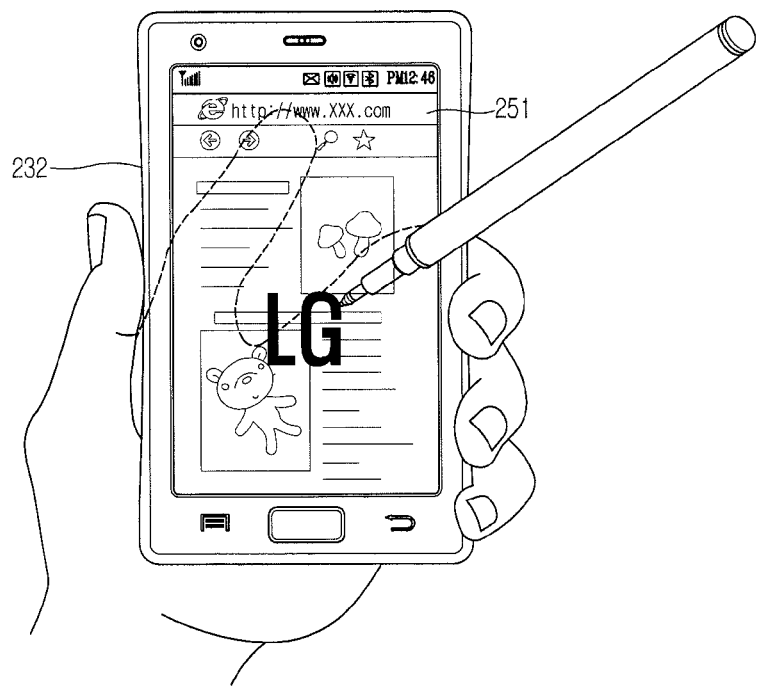

FIGS. 2A and 2B are conceptual views illustrating an operation implemented by the present invention. Referring to FIG. 2A, the terminal is provided with a display unit 251 disposed at one surface of the body, for example, a front surface thereof. The display unit 251 may be provided with a touch sensor for sensing a touch input. Visual information displayed on the display unit 251 may be implemented in the form of images, text and icons and the like, and a web page including them may be displayed thereon according to the drawing.

Furthermore, according to the drawing, a lateral surface of the body is made to allow the user to squeeze the terminal. For such an example, a squeeze sensing unit 232 is disposed at a lateral surface of the body.

Referring to FIG. 2B, when the user exerts a pressure to the squeeze sensing unit 232 in a webpage mode, namely, when a squeeze is made against the terminal body, a webpage of the display unit 251 is switched to a handwriting mode (or the execution of a quick memo application). In this instance, the display unit 251 is configured to enable a handwriting through a touch input in a handwriting mode. More specifically, a screenshot for the screen of a webpage displayed on the display unit is performed, and as a result a memo can be immediately left on the screen.

In this manner, though a control command for switching to the handwriting mode may be performed by a separate hot key, according to the present invention, the squeeze sensing unit 232 can perform the role of a hot key without selecting a separate hot key. Further, the terminal may be configured to receive a squeeze input in addition to a touch input, and both those inputs may be interlocked with each other according to circumstances.

Figure 3A:
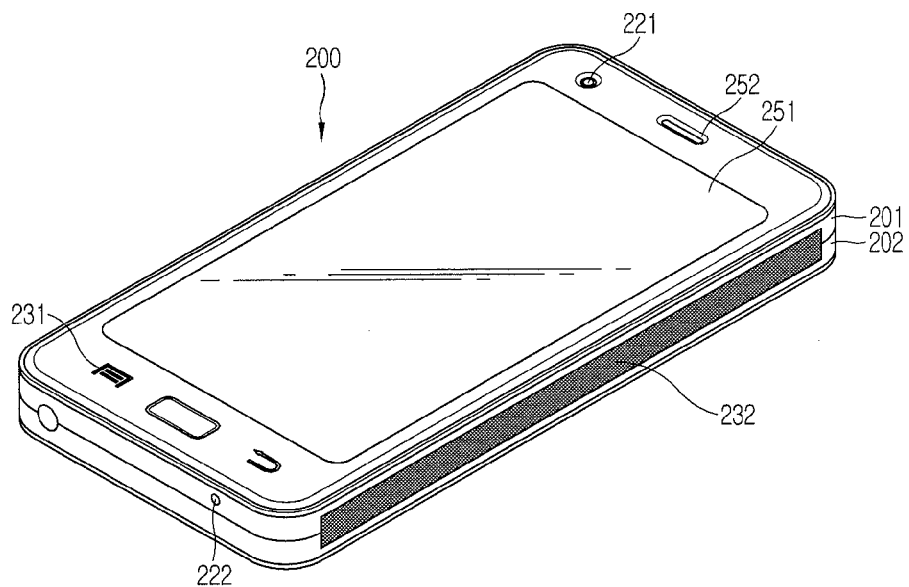
FIG. 3A is a front perspective view illustrating an example of a mobile terminal associated with the present invention.
Figure 3B:
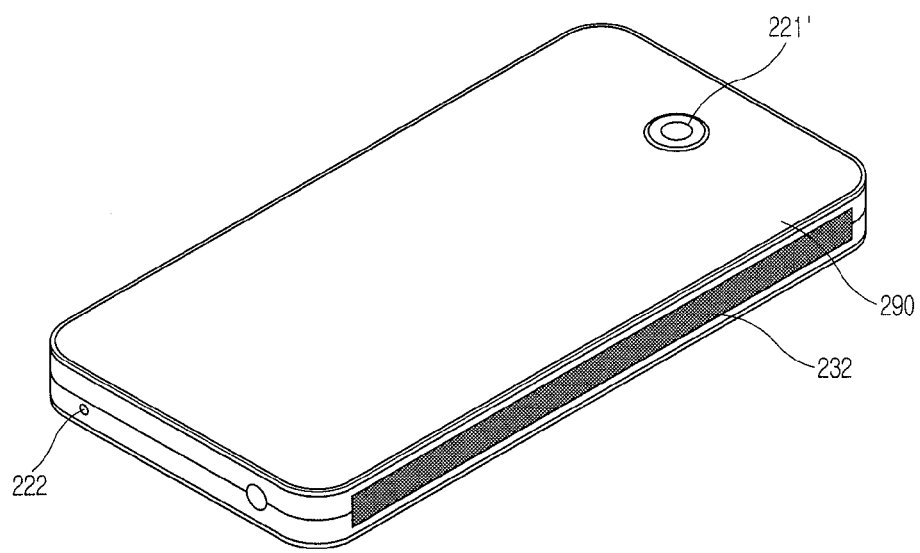
FIG. 3B is a rear perspective view illustrating a mobile terminal illustrated in FIG. 3A.
Figure 3C:
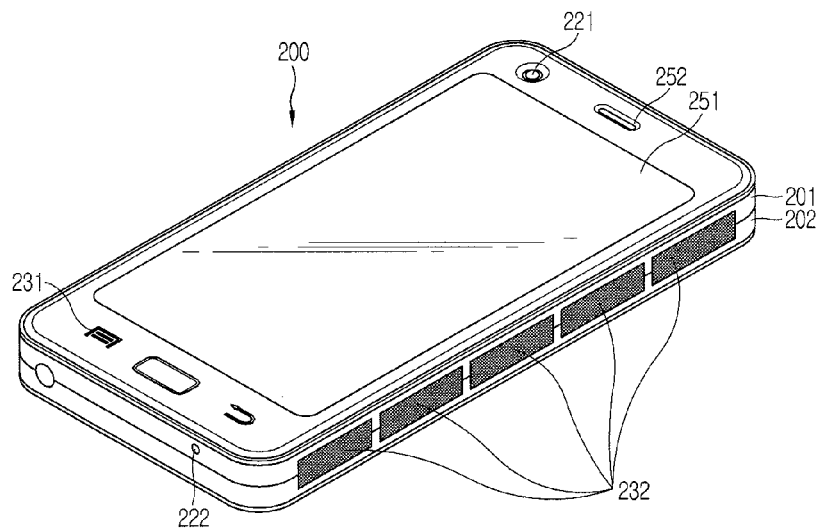
FIG. 3C is a perspective view illustrating a modified example of a mobile terminal in FIG. 3.

Hereinafter, the hardware configuration of a mobile terminal performing the operation of FIGS. 2A and 2B will be described in more detail. FIG. 3A is a front perspective view illustrating an example of a mobile terminal associated with the present invention, FIG. 3B is a rear perspective view illustrating a mobile terminal illustrated in FIG. 3A, and FIG. 3C is a perspective view illustrating a modified example of a mobile terminal illustrated in FIG. 3.

The mobile terminal 200 disclosed herein is provided with a bar-type portable phone body. However, the present invention is not only limited to this type of terminal, but also applicable to various structures of terminals such as slide type, folder type, swing type, swivel type, and the like, in which two and more bodies are combined with each other in a relatively movable manner.

The body includes a case (casing, housing, cover, etc.) forming an external appearance thereof. In this embodiment, the case is divided into a front case 201 and a rear case 202. Various electronic components may be incorporated in a space formed between the front case 201 and the rear case 202.

The cases may be formed by injection-molding a synthetic resin or may be also formed of a metal material such as stainless steel (STS), titanium (Ti), or the like.

The display unit 251, an audio output unit 252, a camera module 221, and the like are formed at the terminal, mainly at the front case 201. An interface and the like is disposed at a lateral surface of the front case 201 and rear case 202.

The display unit 251 occupies most of the main surface of the front case 201. In other words, the display unit is disposed at a front surface of the terminal, and formed to display visual information. The audio output unit 252 and the camera module 221 are disposed on a region adjacent to one of both end portions of the display unit 251, and the front surface input unit 231 and the microphone 222 are disposed on a region adjacent to the other end thereof.

The front surface input unit 231 may include a plurality of manipulation units as an example of the user input unit 130 (refer to FIG. 1). The manipulation units may be commonly designated as a manipulating portion, and any method can be employed including a tactile manner allowing the user to perform manipulation with a tactile feeling. According to this embodiment, the front surface input unit 231 is configured with a touch key. Furthermore, the display unit 251 may form a touch screen along with a touch sensor, and in this instance, the touch screen may become a user input unit. Through this, the front surface of the terminal is configured with a form factor in which a push key is not disposed at a lower portion of the touch screen. However, the present invention is not limited to this, and the front surface input unit 231 may be configured only with a push key, or configured with no front surface input unit on the front surface of the terminal.

Referring to FIG. 3B, a camera module 221' is additionally mounted at a rear surface of the terminal body, namely, the rear case 202. The camera module 221' has an image capturing direction, which is substantially opposite to the direction of the camera module 221 (refer to FIG. 3A), and may have different pixels from those of the camera 221.

For example, the camera module 221 preferably has a relatively small number of pixels enough not to cause difficulty when the user captures his or her own face and sends it to the other party during a video call or the like, and the camera module 221' has a relatively large number of pixels since the user often captures a general object that is not sent immediately. The camera modules 221, 221' may be provided in the terminal body in a rotatable and popup-ready manner.

Furthermore, a flash and a mirror may be additionally disposed adjacent to the camera module 221'. The flash illuminates light toward an object when capturing an object with the camera module 221'. The mirror allows the user to look at his or her own face, or the like, in a reflected way when capturing himself or herself (in a self-portrait mode) by using the second camera module 221'.

An audio output unit may be additionally disposed at a rear surface of the terminal body. The audio output unit on the rear surface along with the audio output unit 252 on the front surface (refer to FIG. 3A) can implement a stereo function, and may be also used to implement a speaker phone mode during a phone call.

A power supply unit 290 for supplying power to the portable terminal 200 may be mounted on the terminal body. The power supply unit 290 may be incorporated into the terminal body, or configured to be directly detachable from an external portion of the terminal body. A retractable broadcast antenna 222 is also shown in the Figures.

Referring to FIGS. 3A and 3B again, the squeeze sensing unit 232 is disposed at a lateral surface of the body, and formed to sense a pressure above a predetermined value being applied.

More specifically, for the location of the squeeze sensing unit 232, the squeeze sensing unit 232 may be located at a lateral surface of the front case 201 and rear case 202. Furthermore, the squeeze sensing unit 232 may be also located at another lateral surface of the front case 201 and rear case 202. In other words, the squeeze sensing unit 232 may be located at both lateral surfaces of the front case 201 and rear case 202 in the form of facing each other. However, the squeeze sensing unit 232 may be located only at a lateral surface of the terminal or located at all four surfaces thereof.

On the other hand, referring to FIG. 3C, a plurality of the squeeze sensing units 232 are provided therein, and disposed to be separated from one another along one lateral surface of the terminal bar. Accordingly, when a pressure is applied to the squeeze sensing unit 232 by the user's left or right hand, the controller 180 (refer to FIG. 1) can detect a pressure occurring according to the location at which each finger is placed.

Figure 4:
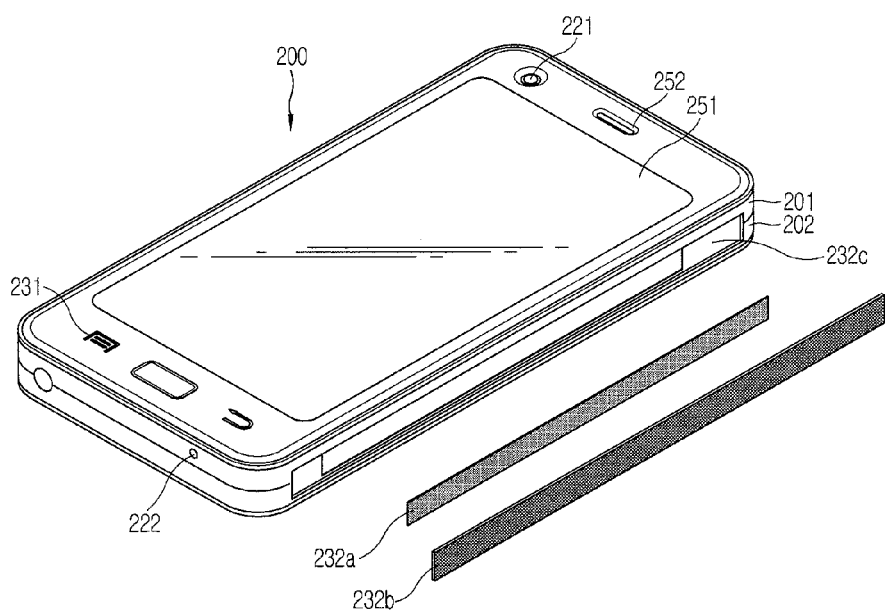
FIG. 4 is a partial exploded view illustrating a mobile terminal in FIG. 3A.

As described above, the squeeze sensing unit 232 according to the present invention implements a new type of manipulation unit. Hereinafter, the configuration of the squeeze sensing unit 232 will be described in more detail. FIG. 4 is a partial exploded view illustrating a mobile terminal in FIG. 3A.

As illustrated in FIG. 4, the squeeze sensing unit 232 includes a squeeze sensor 232a and an elastic member 232b. The squeeze sensor 232a is disposed at a lateral surface of the terminal body, and one or more squeeze sensors may be provided therein. Specifically, the squeeze sensor 232a may detect a squeeze state (or user's squeeze operation) generated by fingers applying a pressure above a preset value. A mounting groove 232c on which the squeeze sensor 232a can be mounted is formed at a lateral surface of the terminal body.

Further, the terminal can distinguish a grip state from a squeeze state according to the size of a pressure applied to the squeeze sensing unit 232. For example, when a pressure less than a preset value is applied to the squeeze sensing unit 232, it may be classified into a grip state. On the contrary, when a pressure above a preset value is applied to the squeeze sensing unit 232, it may be classified into a squeeze state. The controller 180 can perform a control operation according to a pressure applied to the squeeze sensing unit 232 in a squeeze state.

The elastic member 232b is configured to cover the squeeze sensor 232a at a lateral surface of the terminal body, and formed to be elastically deformed by a pressure to the lateral surface. For such an example, the elastic member 232b may be a rubber band lengthily formed along the lateral surface.

Furthermore, the squeeze sensing unit 232 may include a feedback module for outputting an acoustic or tactile feedback when a pressure is sensed on the squeeze sensor. For example, when in a squeeze state, it may be possible to output a specific sound, provide a pressurizing force to the rubber pad in an opposite direction to the squeeze direction, providing vibration to the terminal, or the like.

The squeeze sensing unit 232 can convert a pressure applied to a specific portion into an electrical input signal. Furthermore, the squeeze sensing unit 232 can detect a pressure size, a number of times with which the pressure is applied, a time for which the pressure is applied, a location at which the pressure is applied, and an area to which the pressure is applied. At this time, the display unit 251 may display an indicator indicating at least one of a pressure size, a number of times with which the pressure is applied, a time for which the pressure is applied, a location at which the pressure is applied, and an area to which the pressure is applied.

Also, the controller 180 can determine whether a user's hand holding the body is his or her left and right hand based on a position to which the pressure is applied. If a squeeze is applied with his or her left hand, a pressure to the squeeze sensing unit by his or her four fingers is sensed, and in this instance the squeeze sensing unit 232 may be provided only at the right hand side of the terminal.

The squeeze sensing unit 232 having the foregoing configuration provides a new type of user interface associated with a handwriting mode as well as an operation presented in FIGS. 2A and 2B. Thus, the mobile terminal can recognize a kind of the squeeze operation using the squeeze sensing unit 232, and generate a different control command associated with the handwriting mode according to the kind. Hereinafter, novel user interfaces according to a squeeze operation particularly in connection with the handwriting mode will be described as an example.

Figure 6A:
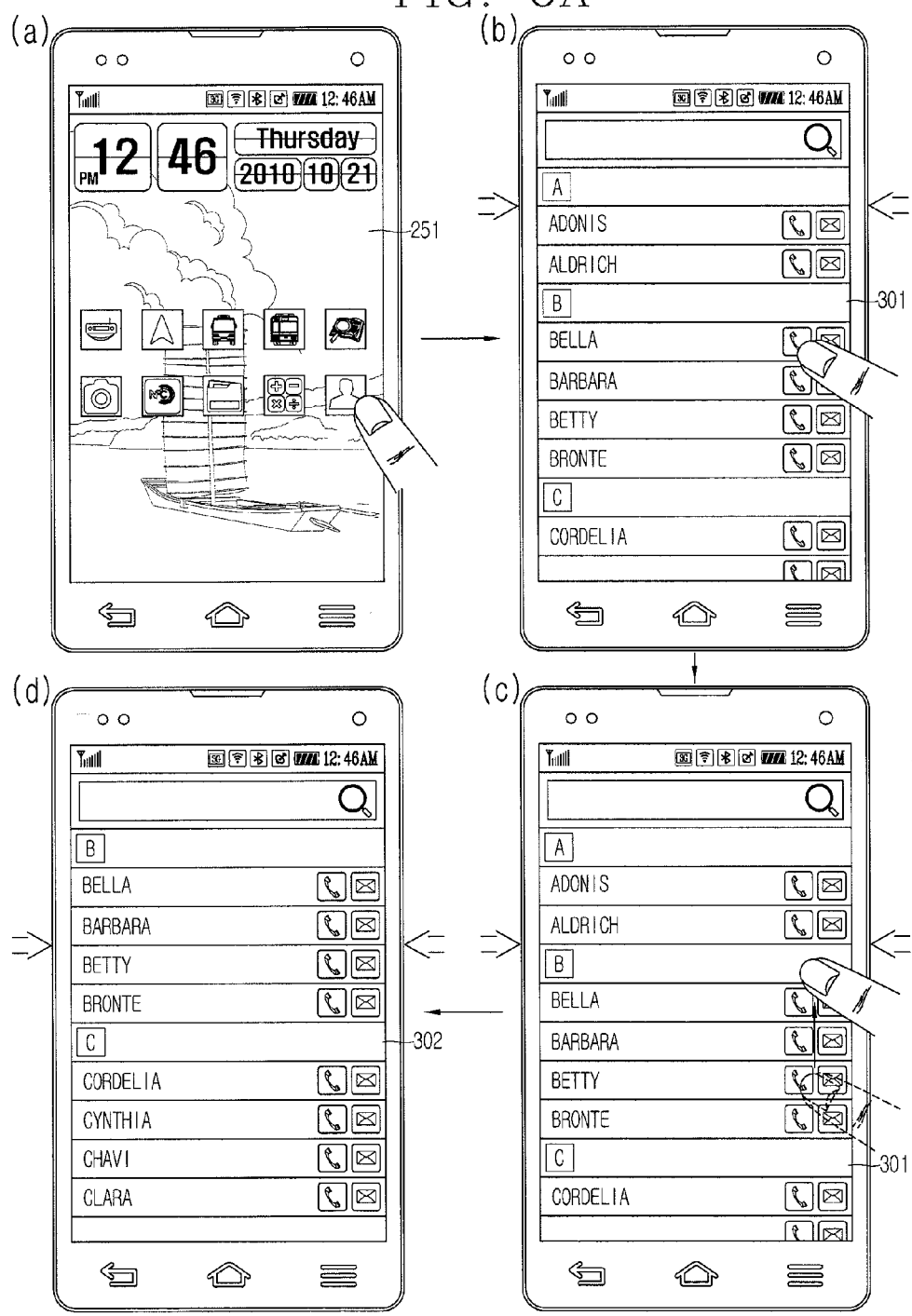

Next, FIG. 5 is a conceptual view illustrating a control method of a mobile terminal according to an embodiment of the present invention, and FIG. 6A is a conceptual view illustrating the control method of FIG. 5.

First, as illustrated in FIG. 6A, when a user's touch input is applied to an icon to which an execution command for implementing a specific application is applied, a specific application corresponding to the icon is activated based on the user's touch input. In more detail, as illustrated in FIGS. 6A(a) and 6A(b), the controller 180 controls the display unit 251 to display a first execution screen 301 of the contact list application based on a touch input applied to the contact list icon.

Here, the first execution screen 301 corresponds to screen information in which an application is activated and displayed for the first time by a touch input applied to the icon.

The first execution screen 301 of the contact list application may include information on phone numbers stored in the mobile terminal in an alphabetical order. Furthermore, the first execution screen 301 may include a call icon corresponding to each phone number to immediately place a call to the relevant phone number based on the user's touch input and a message icon capable of immediately sending a message to the relevant phone number based on the user's touch input. Furthermore, when a touch input is applied to a representative name stored to correspond to each phone number, the controller 180 may control the display unit 251 to display information corresponding to the representative name.

In other words, the first execution screen 301 may include at least one graphic image for receiving a control command driving the mobile terminal using a phone number corresponding to the representative name. In other words, the controller 180 controls the mobile terminal to display a message sending screen capable of implementing a call connection through the wireless communication unit or sending a message to the relevant phone number based on the user's touch input applied to a specific graphic image on the display unit for displaying the first execution screen 301 of the contact list application.

On the other hand, the first execution screen 301 may include only some of the representative names and phone numbers stored in the memory 160. In other words, the display unit 251 may be unable to display all information stored in the memory 160 due to the size of the display unit 251.

Accordingly, when a touch input with a specific gesture is applied to the display unit 251 for displaying the first execution screen 301 including only some of the representative names and phone numbers, the controller 180 can control the display unit 251 to switch the first execution screen 301 to a second execution screen 302 including screen information different from screen information contained in the first execution screen 301.

In addition, at least part of the screen information of the second execution screen 302 is different from the screen information of the first execution screen 301. The first and the second execution screen 301, 302 may be defined to include at least one region of the screen information consecutive to each other.

In other words, the controller according to the present embodiment controls the display unit 251 to switch the screen information of the display unit 251 to another screen information including its consecutive information or another screen information performing a preset operation based on a touch input.

Referring to FIG. 5, the mobile terminal receives a control command (S310). The control command denotes various kinds of input signals applied by the user to operate the mobile terminal. The control command corresponds to various input signals received through the user input unit 130 of the mobile terminal. For example, the input signal may be generated by a touch input applied to the display unit 251 such as application to the front surface input unit 231 or the like.

In addition, the a control command in FIG. 6A corresponds to a touch input applied to the display unit 251. The controller 180 can control the display unit 251 to switch the first execution screen 301 to the second execution screen 302 or control the mobile terminal to perform a specific operation using a phone number according to a touch input applied to a graphic image of the first execution screen 301.

The controller 180 then detects a squeeze operation based on a pressure applied to the body of the mobile terminal (S320). As described above, a pressure is sensed by the squeeze sensing unit 232 mounted on the body of the mobile terminal 200, and the squeeze sensing unit 232 is formed at an outer portion of the mobile terminal body.

The applying a pressure to the body may occur prior to or subsequent to the applying the control command. In other words, it may correspond to both cases where a squeeze operation based on a pressure to the body is sensed subsequent to applying a touch input to the display unit 251, and where a touch input is applied to the display unit 251 subsequent to sensing a squeeze operation by a pressure to the body, and also the two operations may occur at the same time.

When a squeeze operation of the mobile terminal body is sensed, the controller limits at least part of the control command based on this (S330). In other words, when a squeeze operation is sensed according to the present embodiment, part of the control command generated by a touch input is limited. In the Figures, a squeeze operation is illustrated as two arrows displayed in the direction of mobile terminal body.

For example, when a squeeze operation is sensed by a pressure applied to the body and a touch input is applied to the display unit, the controller 180 limits part of the control command based on the touch input. In other words, the controller 180 limits a touch input controlling the execution of an operation corresponding to a graphic image among the touch inputs based on the squeeze operation. For example, the controller 180 controls the mobile terminal 200 not to place a call or activate a page for sending text even when a touch input is applied to the graphic image.

Accordingly, the controller 180 controls the display unit 251 to switch the first execution screen 301 to the second execution screen 302 based on a gesture of the touch input applied to the display unit 251. The touch input may correspond to a touch input in a flicking manner. Even when a starting point of the touch applied to the display unit among the gestures of the touch input corresponds to the graphic image, the controller 180 controls the mobile terminal 200 not to generate an operation corresponding to the graphic image.

On the other hand, even when a touch input other than a touch input in a flicking manner, an input in a long touch manner or the like is applied to a graphic image contained in the first execution screen 301, the controller 180 limits the execution of an operation corresponding to the graphic image. For example, even when a long touch input is applied to the graphic image for a preset period of time in FIG. 6A(b), the controller 180 does not place a call or send a message for the touché phone number.

Accordingly, when one of a plurality of operations is performed based on one control command, the user can limit the execution of at least one operation among them based on a pressure to the body. Consequently, the user can apply a control command with more accurate intent to the mobile terminal 200, thereby enhancing accuracy and preventing an erroneous control command from being applied.

Furthermore, it is possible to prevent an operation of the mobile terminal 200 based on a touch input to the graphic image that immediately performs a preset operation such as performing a call function or the like.

Figure 6B:
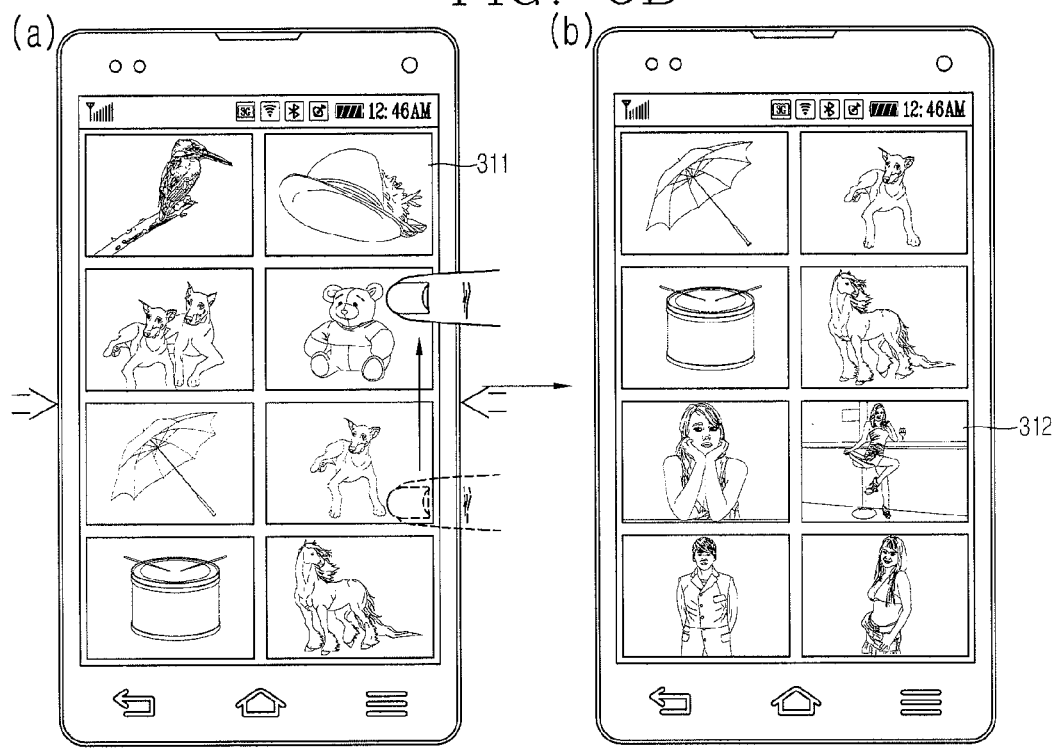

A control method by a touch input applied to the display unit for displaying screen information containing a plurality of images or the like will now be described with reference to FIG. 6B. As shown, a plurality of images (or photos, pictures, videos, etc.) are arranged on first screen information 311 according to the present embodiment.

The controller 180 then controls the display unit to switch the first screen information 311 to second screen information 312 containing other images that are not contained in the first screen information 311, or display one image contained in the first screen information 311 in an enlarged manner based on a touch input applied to the display unit for displaying the first screen information 311.

As discussed above, a control command for switching the first screen information 311 to the second screen information 312 may be generated based on a touch input in a flicking manner. Furthermore, a control command for controlling to display an image or the like contained in the first screen information 311 in an enlarged manner may be generated by a touch to the relevant image, a touch input in a long touch manner, etc.

In more detail, if a squeeze operation by a pressure applied to the body is sensed, then the controller 180 ignores a control command for displaying the image or the like in an enlarged manner when a touch input is applied to one region of the display unit for displaying the image or the like. Furthermore, if a touch input in a flicking manner is applied to the display unit, the controller 180 limits the display unit to switch the first screen information 311 to the second screen information 312.

However, a control command limited based on the squeeze operation is not restricted to a control command for displaying an image to which a touch input is applied in an enlarged manner. For example, the controller 180 can control the display unit to limit an operation such as selecting an image or the like to which the touch input is applied or selecting and moving the image or the like.

Accordingly, when a plurality of images or the like are arranged and they are desired to be displayed in a sequential manner based on a touch input, the generation of a control command based on a touch input applied to each image may be limited. Consequently, when the user wants to display a plurality of images in a sequential manner, it may be possible to prevent a problem from being switched to an unintentional screen information based on a touch input applied to each image. In particular, when most area of the screen information is formed with a region in which a touch input for generating a preset control command is applied, it is possible to more effectively prevent the generation of an erroneous control command.

A control method by a touch input applied to the display unit for displaying screen information containing a plurality of control images or the like will now be described with reference to FIG. 6C. As show, the first screen information 321 according to an embodiment of the present invention may include a plurality of link images (or text, photos, pictures, videos, etc.). The first screen information 321 may correspond to a web browsing screen. The web browsing screen may include a plurality of link images containing the addresses of other screen information. The controller 180 can control the display unit to switch to the web browsing screen of an address containing the link image based on a touch input applied to the link image.

As discussed above, control command for switching the first screen information 321 containing at least one link image to second screen information 322 containing a different link image from the link image may be generated based on a touch input in a flicking manner. Furthermore, a control command for controlling the display unit to switch to a screen corresponding to the link address of a link image contained in the first screen information 321 may be generated by a touch applied to the relevant link image, a touch input in a long touch manner, etc.

The link image may be contained in the first and the second screen information 321, 322, and the arrangement of a plurality of link images may be irregular. Furthermore, in some display states, the user may be unable to recognize whether or not an image contained in the first and the second screen information 321, 322 includes a link address.

However, if a squeeze operation is sensed by a pressure applied to the body of the mobile terminal, then the controller 180 ignores a control command for switching to a screen corresponding to the link address when the touch input is applied to one region of the display unit for displaying the link image or the like.

Furthermore, if a touch input in a flicking manner is applied when the squeeze operation is sensed, then the controller controls the display unit to switch the first screen information 321 to the second screen information 322.

According to the present embodiment, when a link image containing the address of the screen information switched by a touch input is arranged in an irregular manner on the screen information or the user is unable to recognize whether or not it contains a link address, it is possible to prevent being switched to screen information corresponding to the link address by a touch input to an arbitrary region on the display unit. Accordingly, it is possible to enhance the accuracy of a touch input and prevent a control command that is not expected by the user from being generated.

Next, FIGS. 7A and 7B are conceptual views illustrating a control method for limiting the function of the mobile terminal in an active state. Referring to FIG. 7A(a), the controller 180 controls the mobile terminal to reproduce the video file based on the user's touch input for generating a video reproduction control command. For example, the controller 180 controls the display unit to display a moving image of the video file, and controls the audio output unit 252 to output the sound of the video file.

Referring to FIGS. 7A(b) and 7A(c), the controller 180 senses a squeeze operation by a pressure applied to the mobile terminal body, and limits at least part of the reproduction operation of the mobile terminal based on this. For example, the controller 180 controls the display unit to limit the output of the image of the video file image, and controls the audio output unit 252 to limit the output of the sound of the video file based on the squeeze operation.

Furthermore, when the squeeze operation is sensed, the controller 180 controls the reproduction operation of the video file. In other words, the controller 180 controls the display unit to display an output limit screen displaying a phrase "MOVIE IS HOLDING (OR PAUSING)" instead of the image of the video file. Furthermore, the controller 180 controls the audio output unit 252 to suspend the output of the sound being output by the reproduction operation of the video file.

In addition, referring FIGS. 7A(b) and 7A(d), the controller 180 controls the mobile terminal to limit at least part of the reproduction operation of the video file when the squeeze operation is sensed. In other words, the controller 180 controls the audio output unit 252 to limit the output of the sound without limiting the output of the moving image of the video file.

Thus, when the mobile terminal is operated in the reproduction mode of a video file, the controller 180 can limit only part of the reproduction operation of the video file limited by the squeeze operation. For example, when the squeeze operation is sensed by the user's setting, the controller 180 can control the mobile terminal to limit at least one of outputting of the sound of the video file, switching of consecutive images, and outputting of an image itself.

Accordingly, the user can limit at least one operation in the reproduction mode of video. It may be controlled by a pressure to the body of the mobile terminal and thus the control method thereof is more convenient.

Next, a control method for limiting at least part of a capture operation in the capture mode will be described with reference to FIG. 7B. Referring to FIGS. 7B(a) and 7B(b), the controller 180 switches the mobile terminal to a capture mode based on a touch input applied to an icon for receiving a control command of capture mode activation.

Accordingly, the controller 180 activates a camera 121 of the mobile terminal, and controls the display unit to display an image being received by a lens of the camera in real time. Then, when a squeeze operation applied to the body of the mobile terminal is sensed while displaying an image by the camera lens, the controller 180 limits at least part of the operation of the camera mode.

For example, when the squeeze operation is sensed, the controller 180 controls the display unit to limit the output of an image by the camera lens. In other words, the controller 180 may control the display unit to display a capture limit image containing a phrase "CAMERA IS HOLDING" instead of capturing by the camera lens.

Furthermore, when a control command is applied to a graphic image or signal input unit for receiving a control command storing an image captured by the camera lens, the controller 180 may generate a control command for this or limit the generation of a control command for this.

In other words, when a control command is applied to the graphic image or the like while the capture limit image is displayed on the display unit, the controller 180 may control the mobile terminal to limit also the operation of storing the captured image. However, the capture operation is not limited to storing an image currently being captured by the camera separately from the capture limit image displayed on the display unit.

Referring to FIGS. 7B(c) and 7B(d), when the squeeze operation is sensed, the controller 180 controls the capture operation of the camera that has been limited to be activated again.

Accordingly, when the capture operation should be suspended in a capture mode of the camera for a while, the user may apply a pressure to the body of the mobile terminal, thereby more conveniently limiting the operation. Consequently, it is possible to solve a problem such as implementing the capture operation in an unintentional way.

Furthermore, an application may be activated again by limiting the capture operation due to a squeeze operation for a while without completely terminating the application, and thus the user can control the operation to be conveniently performed again.

As described above, a squeeze operation is sensed by a pressure applied to the body of the mobile terminal. Further, the controller 180 controls the mobile terminal to limit part of the operation of the mobile terminal or memorize the limited operation again based on the squeeze operation, and perform in the operation again based on a different squeeze operation. In other words, the controller 180 limits, memorizes or activates the operation based on a preset squeeze operation. Hereinafter, the type of the squeeze operation for limiting, memorizing or activating the operation will be described.

Figure 8A:
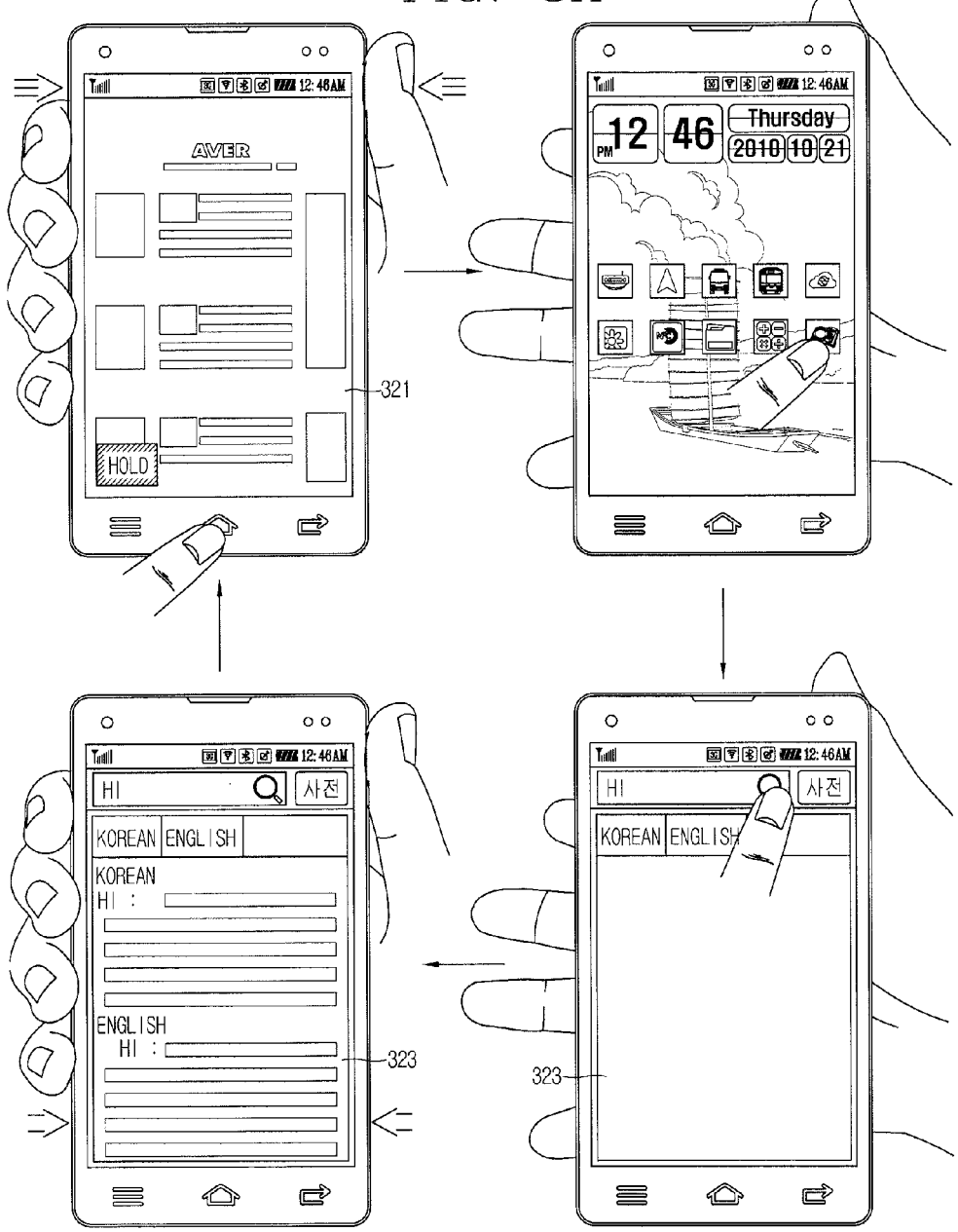
FIGS. 8A and 8B are conceptual views illustrating the type of different squeeze operations.
Figure 8B:
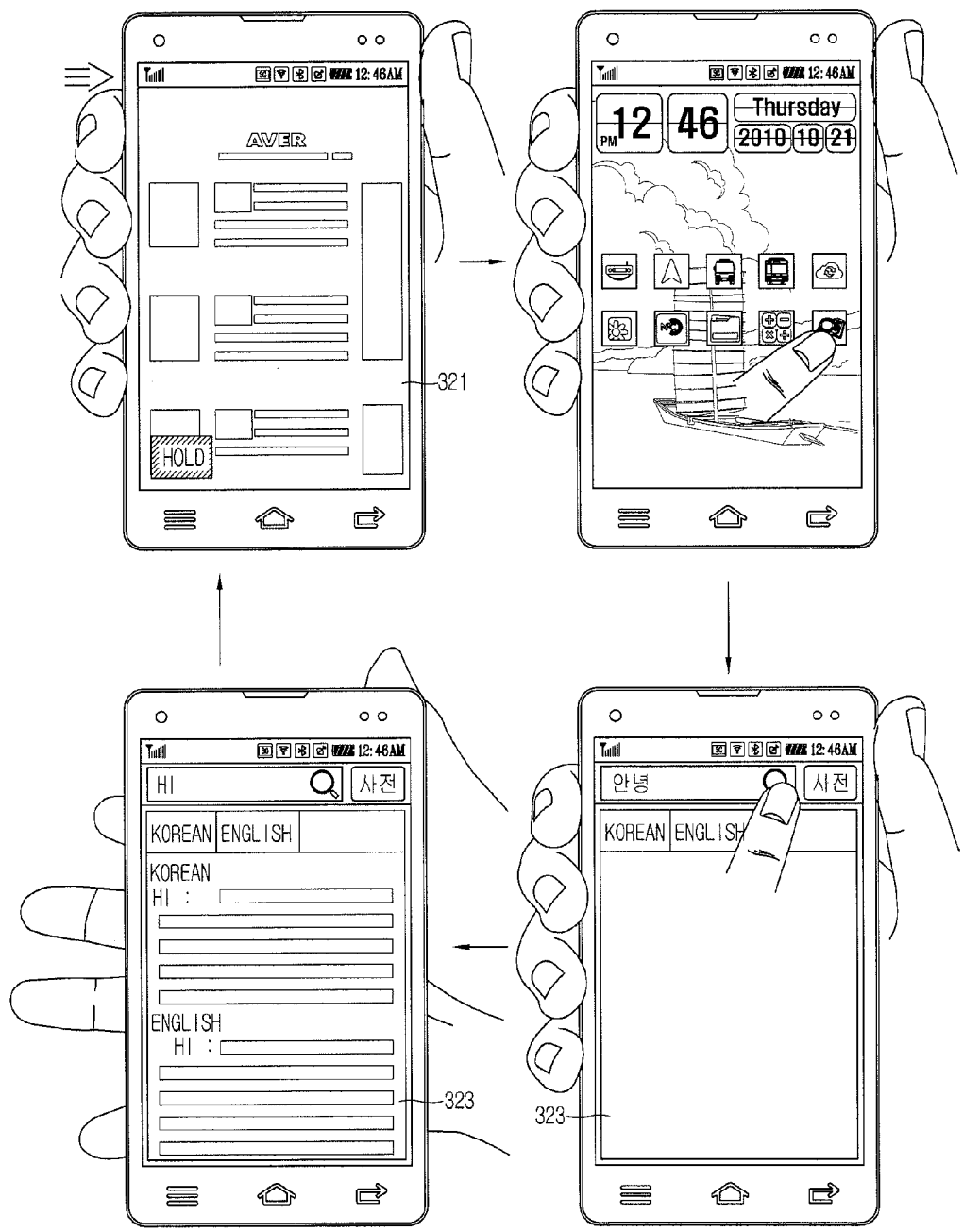

FIGS. 8A and 8B are conceptual views illustrating the type of different squeeze operations. A body containing a display unit for displaying the first screen information 321 is pressurized by the user's hand. In other words, the user applies a pressure to the body by grasping his or her hand. The controller 180 then limits the termination of an application corresponding to the first screen information 321 due to a squeeze operation sensed by a pressure to the body.

Furthermore, the controller 180 displays an indicator "HOLD" for limiting the termination of the relevant application on the first screen information 321. In other words, when part of the control command is limited based on the squeeze operation, the controller 180 may control the display unit to display an indication that part of the control command is currently limited, thereby allowing the user to confirm a state in which the squeeze operation is applied. That is, the controller 180 memorizes or stores the first screen information 321 based on the squeeze operation.

Referring to FIG. 8A, the user's hand that has applied a pressure to the body is opened to release the pressure to the body by his or her hand. The controller 180 then controls the display unit to display a home screen page including an icon corresponding to at least one application by a touch input applied to the signal input unit in a state that the pressure to the body is released.

The controller 180 controls the mobile terminal to execute a specific application based on the user's touch input when the user's pressure applied to the body is released. Accordingly, the controller 180 controls the display unit to display the execution screen of an application, for example, a dictionary application, which is second screen information 323 different from first screen information 321.

Furthermore, the controller 180 controls the display unit to display a search result on the second screen 323 based on the user's keyword input and search control command. When the body is pressed by the user's hand while the second screen information 323 containing the search result is displayed on the display unit, the controller 180 senses a squeeze operation by that pressure.

The controller 180 then controls the display unit to display the first screen information 321 based on the squeeze operation. In other words, the controller 180 controls the first screen information 321 to be stored therein. If a squeeze operation that has been sensed when displaying the first screen information 321 is sensed again, the controller 180 activates an application corresponding to the first screen information 321 again, and controls the display unit to display the first screen information 321. Accordingly, the controller 180 controls the display unit to display the first screen information 321 without any additional control command by a squeeze operation applied while displaying the second screen information 323.

In other words, when a squeeze operation is sensed according to the present embodiment, the controller 180 limits a preset operation and stores screen information displayed when the squeeze operation is sensed. Consequently, when a squeeze operation is sensed again, the controller 180 controls the mobile terminal to activate the operation again.

Referring to FIG. 8B, the controller limits a preset operation and memorizes first screen information displayed on the display unit while the squeeze operation is sensed.

As discussed above, the controller 180 senses a squeeze operation based on the user's pressure applied to the body of the mobile terminal. When the squeeze operation is sensed, the controller 180 stores first screen information 321 displayed on the display unit and controls the display unit to limit the termination of an application to the first screen information 321.

According to the present embodiment, a pressure is continuously applied to the body of the mobile terminal. While the pressure is continuously applied to the body, the controller 180 controls the display unit to display a home screen page containing at least one icon based on a touch input applied to the display unit. Furthermore, the controller 180 controls the display unit to activate a dictionary application based on the touch input and display the second screen information 323 containing a search result through the search process.

The controller 180 senses a squeeze operation based on the user's pressure applied to the body of the mobile terminal. When the squeeze operation is sensed, the controller stores the first screen information 321, and controls the display unit to limit the termination of an application corresponding to the first screen information 321. According to the present embodiment, contrary to the illustration of FIG. 8A, when a squeeze operation for releasing a continuously applied pressure is sensed, the controller 180 controls the display unit to switch the second screen information 323 to the first screen information 321 with no squeeze operation applied again.

In other words, a control command generated by releasing a continuously applied pressure is substantially the same as a control command generated by a pressure applied to the body for a while and then applied again after a predetermined period of time has passed.

Figure 9:
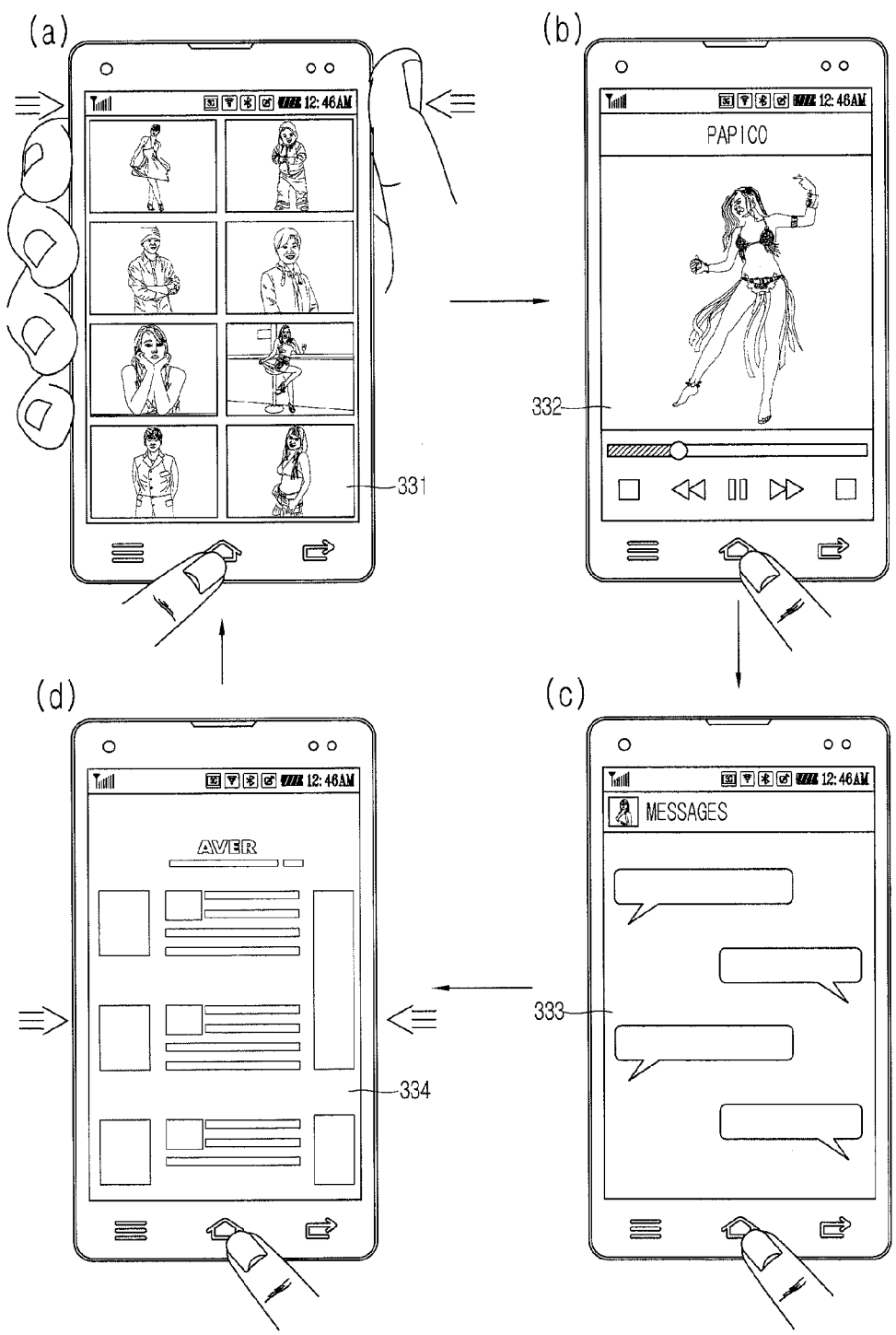
FIG. 9 is a conceptual view illustrating a control method controlling the reactivation of the operation based on a squeeze operation.

Next, FIG. 9 is a conceptual view illustrating a control method controlling the reactivation of the operation based on a squeeze operation. Referring to FIG. 9A, the display unit displays first screen information 331. There is no restriction on the kind of the first screen information 331.

A control command for displaying a home screen page in a state that the first screen information 331 is displayed is applied to the mobile terminal. When a control command for displaying the home screen page is applied, the controller 180 controls the mobile terminal to terminate the activation of an application corresponding to the first screen information 331 and switch the first screen information 331 to a home screen page.

Furthermore, a pressure by the user is applied to the body, and the controller 180 senses it as a squeeze operation. In other words, the control command is applied and a squeeze operation is sensed at the same time.

The controller 180 controls the mobile terminal to limit the termination of an application corresponding to the first screen information 331 based on the squeeze operation. In other words, the application maintains an execution state based on the squeeze operation.

The controller 180 implements another application based on a control command applied to the mobile terminal in the execution state of the application. In other words, the controller 180 may control the display unit to display second through fourth screen information 332, 333, 334 which are the execution screens of different applications based on a control command.

On the other hand, when a squeeze operation is sensed by a pressure applied to the body in a state that the fourth screen information 334 is displayed on the display unit, the controller 180 activates an application corresponding to the first screen information 331 again, and controls the display unit to display the first screen information 331.

In other words, the controller 180 controls the mobile terminal to limit the termination of the initial application of a control command for implementing the another application, and memorize the information of the initial application by a squeeze operation due to a pressure to the body, and activate the initial application again when the squeeze operation is sensed again.

Figure 10:
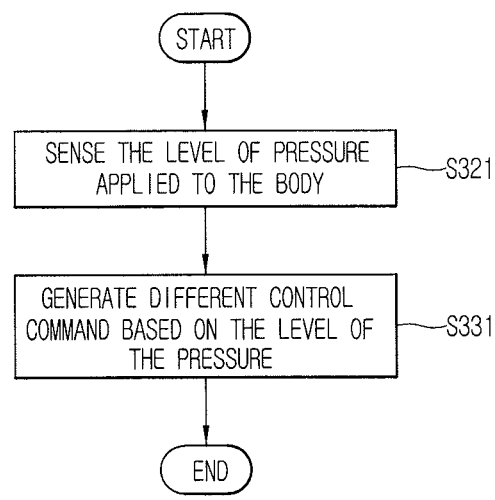
FIG. 10 is a flow chart illustrating a control method to which a different control command is applied based on the level of the pressure.

Next, FIG. 10 is a flow chart illustrating a control method to which a different control command is applied based on the level of the pressure, and FIG. 11A is a conceptual view illustrating a control method of FIG. 10 according to an embodiment.

As shown in FIG. 10, the controller senses a level of the pressure applied to the body (S321). When the pressure is applied to the body, the controller 180 senses the squeeze operation, and controls the mobile terminal based on a different control command depending on the level of the pressure (S331).

FIG. 11A(a) is the execution screen 341 of a contact application for displaying information on phone numbers stored in the memory 160. When a first pressure (A) is applied to the body while displaying the execution screen 341, the controller 180 controls the display unit to display first modified information 342a different from the execution screen 341 as shown in FIG. 11A(b).

For example, the first modified information 342a may include phone numbers that have been communicated with the mobile terminal for a week from the present in a retroactive manner among information associated with phone numbers stored in the memory. Furthermore, the first modified information 342a may include information in which phone numbers communicated with the mobile terminal in a wireless manner are sorted by a wireless communication frequency.

When a second pressure (B) is applied to the body while the execution screen 341, the first modified information 341a or another screen information is displayed on the display unit, the controller 180 controls the display unit to display second modified information 342b which is different from the execution screen 341 and first modified information 342a as shown in FIG. 11A(c). Here, the second pressure (B) corresponds to a pressure having a different level from the first pressure (A). For example, the second pressure (B) may correspond to a pressure stronger than the first pressure (A).

For example, the second modified information 342b displayed by the second pressure (B) may include phone numbers that have been communicated with the mobile terminal for a month from the present in a retroactive manner among information associated with phone numbers stored in the memory. Furthermore, the second modified information 342b may include information in which phone numbers communicated with the mobile terminal in a wireless manner are sorted by a wireless communication frequency.

According to the present embodiment, the controller 180 controls the output of different screen information based on the level of a different pressure. In other words, different control commands based on the level of the pressure generate control commands in the same category. Furthermore, a squeeze operation due to a different input may be directly applied to the mobile terminal as a different control command, and thus the user can control the mobile terminal with a more convenient control method.

A control method for generating a different control command by a touch input based on a squeeze operation with a different level of pressure will now be described with reference to FIG. 11B.

Referring to FIG. 11B, the controller 180 controls the display unit to display consecutive screen information which is consecutive to the initial screen information based on a touch input applied to the display unit for displaying the initial screen information. In other words, the controller 180 controls the display unit to scroll the screen information. The touch input may correspond to a touch input in a flicking or scrolling manner.

The controller 180 controls the display unit to scroll the screen information at the first speed (V1) based on the touch input applied to the display unit. Referring to FIG. 11B(b), when the first pressure (A) is applied to the body of the mobile terminal provided with a display unit for displaying screen information, the controller 180 controls the display unit to display the screen information by scrolling it at the second speed (V2). The second speed (V2) is different from the first speed (V1), and for example, the second speed (V2) may be defined to be faster than the first speed (V 1).

In other words, when a squeeze operation due to the first pressure (A) is applied, it is possible to increase the scrolling speed based on a touch input for scrolling screen information. Furthermore, when the second pressure (B) greater than the first pressure (A) is applied to the body, the controller 180 controls the display unit to display the screen information by scrolling it at a third speed (V3) different from the first and the second speed (V1, V2).

In other words, the controller 180 may control the display unit to display the screen information by increasing the scrolling speed based on a touch input applied to the display unit in proportion to a pressure applied to the body. A control command due to a touch input applied to the display unit may be modified to a control command substantially in the same category by a squeeze operation due to a different pressure applied to the body. Further, the user can squeeze the body at the same time the flicking/scrolling operation is performed or slightly after the flicking/scrolling operation is performed.

Figure 11C:
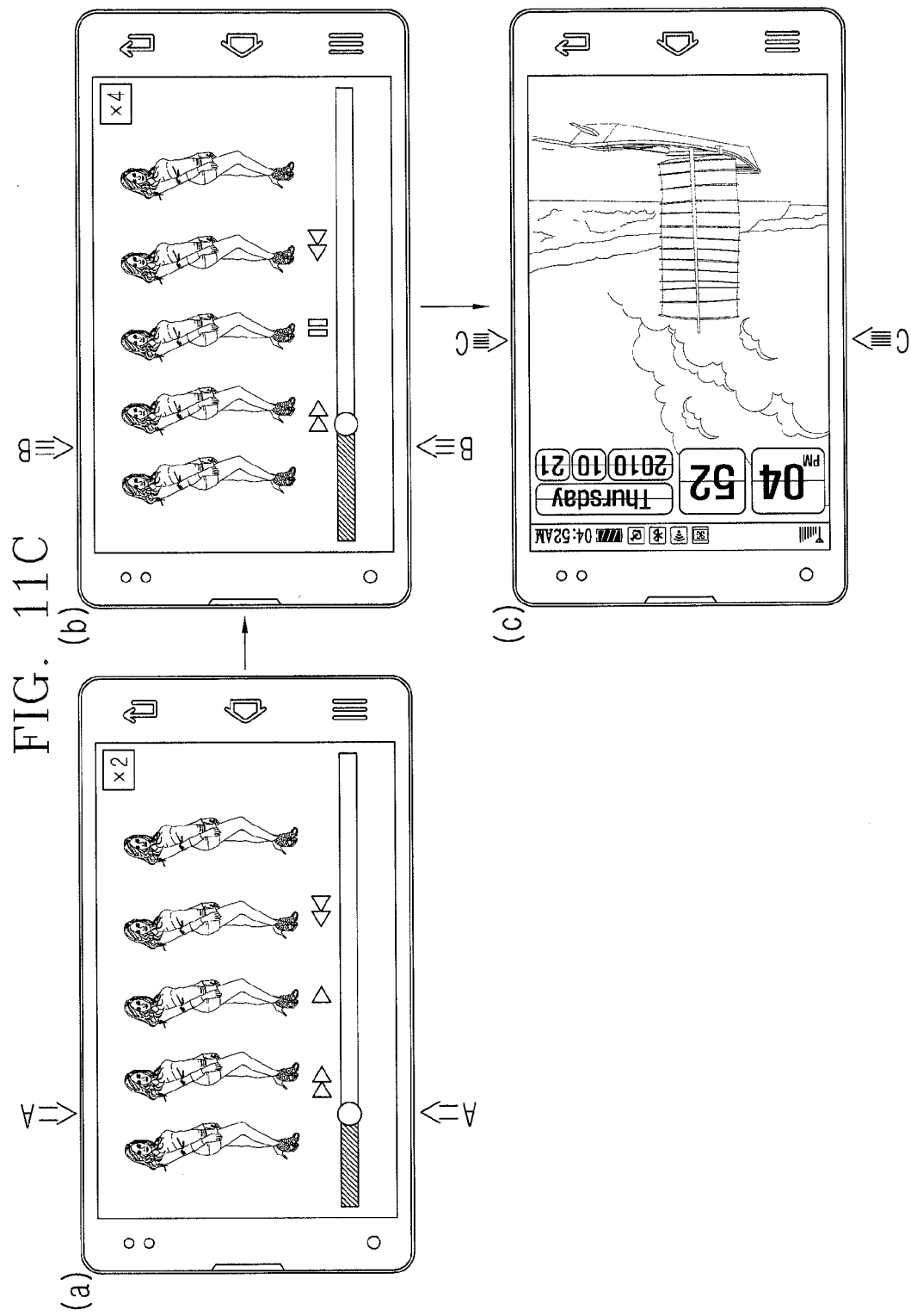

A control method for generating a control command in a different category based on a squeeze operation with a different level of pressure will be described with reference to FIG. 11C. Referring to FIG. 11C(a), the controller 180 controls the mobile terminal to reproduce the video at a twice faster reproduction speed based on the first pressure (A) applied to the body.

Furthermore, referring to FIG. 11C(b), the controller 180 controls the mobile terminal to reproduce the video at a four times faster reproduction speed based on the second pressure (B) different from the first pressure (A) applied to the body.

Here, the second pressure (B) may correspond to a pressure greater than the first pressure (A). Furthermore, times at which the first and the second pressure (A, B) are applied to the body may be consecutive or non-consecutive.

Furthermore, when the first and the second pressure (A, B) applied to the body are released, the controller 180 may control the mobile terminal to reproduce the video at a normal speed again or reproduce the video at twice and four times speed, respectively.

Referring to FIG. 11C(c), the controller may control the mobile terminal to terminate the reproduction of the video based on a third pressure (C) different from the first and the second pressure (A, B) applied to the body.

In other words, the controller 180 generates a control command for terminating the reproduction mode based on a squeeze operation of the third pressure (C). That is, the controller controls the audio output unit 252 to terminate the sound output of the video file, and controls the display unit to switch an image of the video file to the home screen page (or specific image).

However, controlling the execution to be terminated based on a squeeze operation of the third pressure (C) is not limited to the reproduction of video. For example, it is possible to control the termination of a specific application that has been activated by the user, the switching of screen information that has been displayed based on the user's control command to a home screen page, the terminating of a wireless communication state, and the like. The execution state of the mobile terminal applied thereto may be set by the user or set to terminate the execution state when the third pressure (C) is applied in all execution states.

According to the present embodiment, a control command in a different category may be generated by a squeeze operation at a different pressure. Accordingly, the user can control the mobile terminal to perform a preset operation according to the level of the pressure.

Furthermore, the controller 180 controls the mobile terminal to memorize the operation of the mobile terminal based on the squeeze operation at a different pressure, and activate the operation again based on a squeeze operation.

Figure 12A:
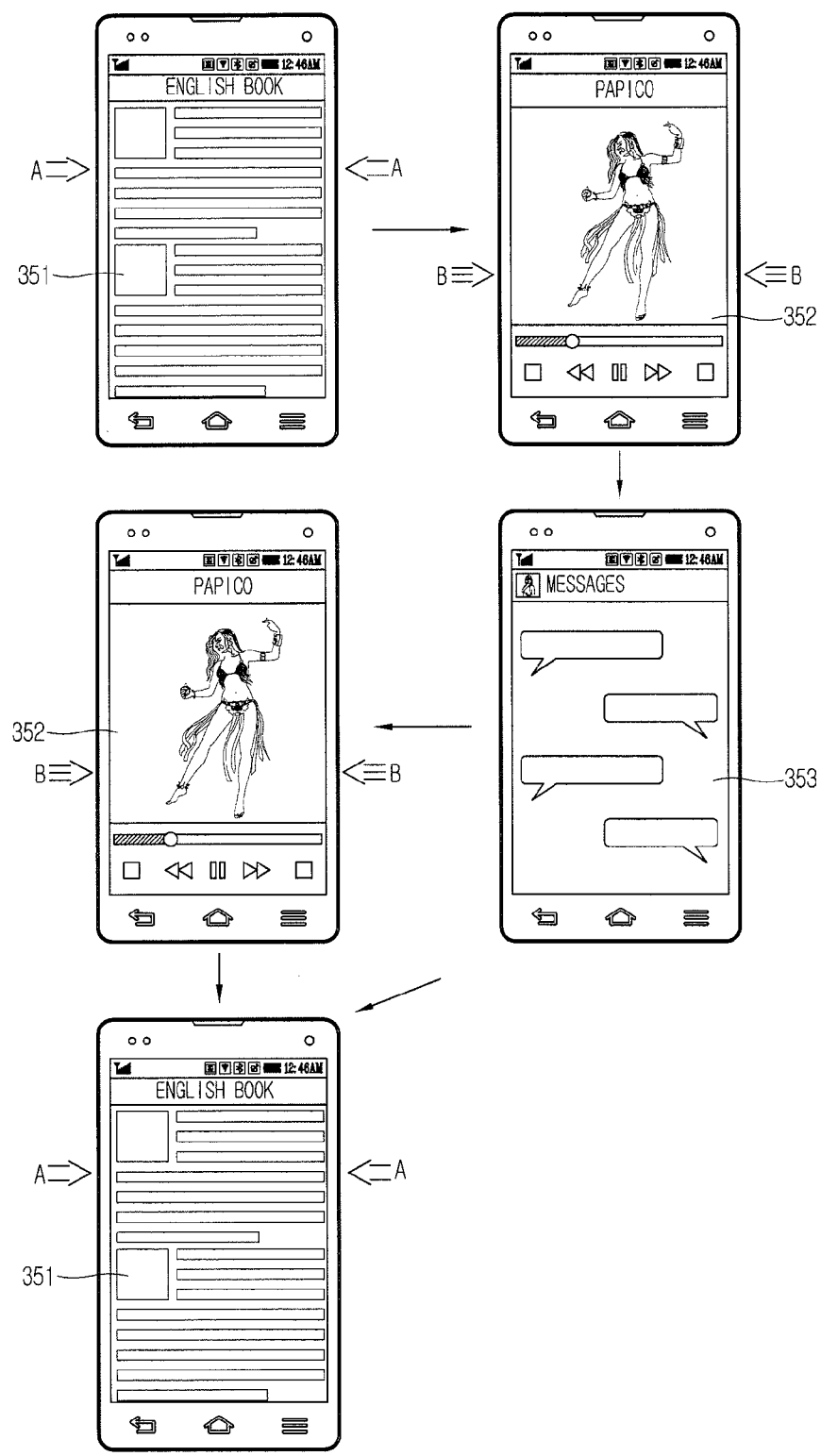
FIGS. 12A through 12C are conceptual views illustrating a control method of information displayed on the display unit according to a squeeze operation based on a different pressure.
Figure 12B:
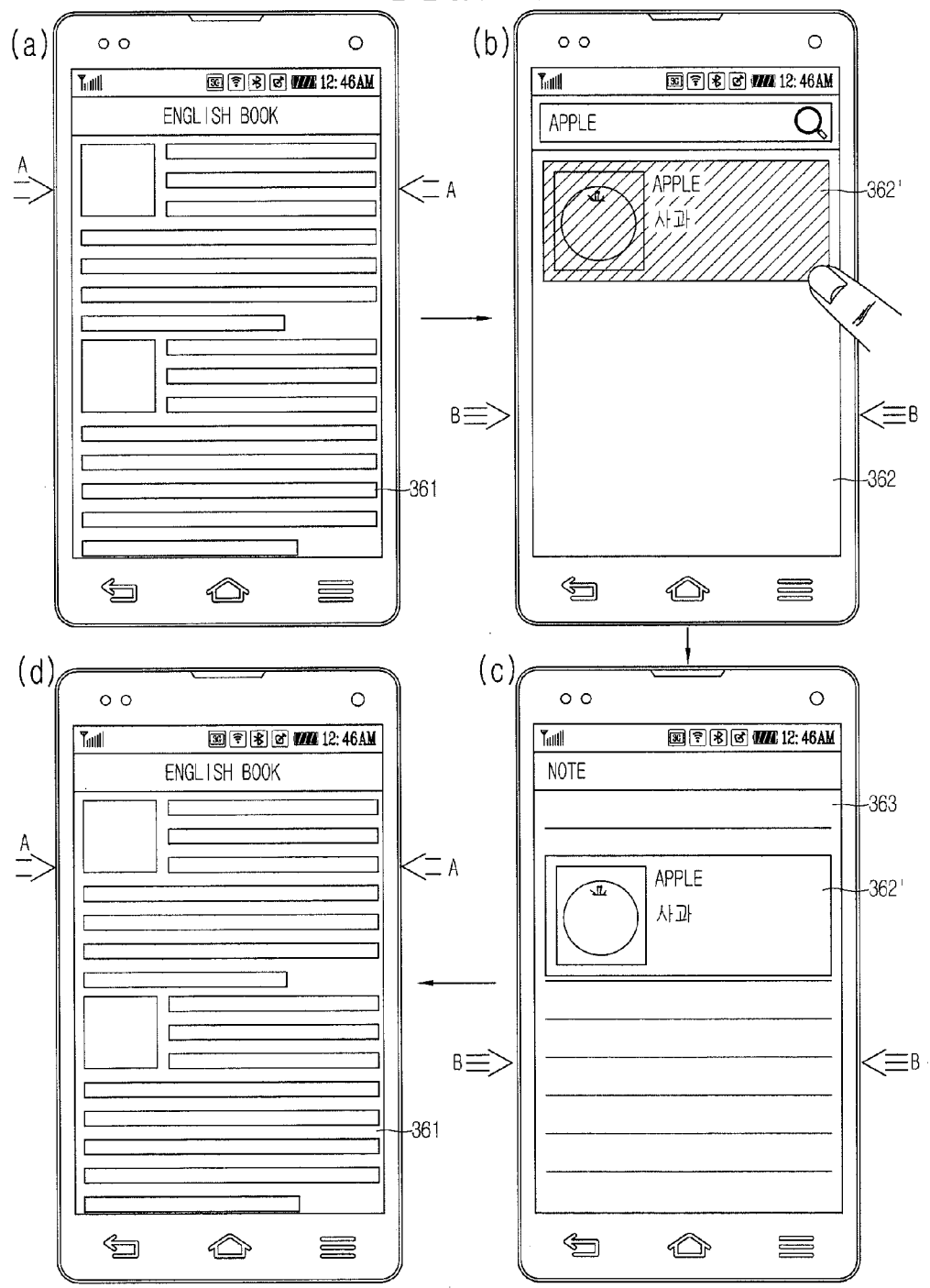
Figure 12C:
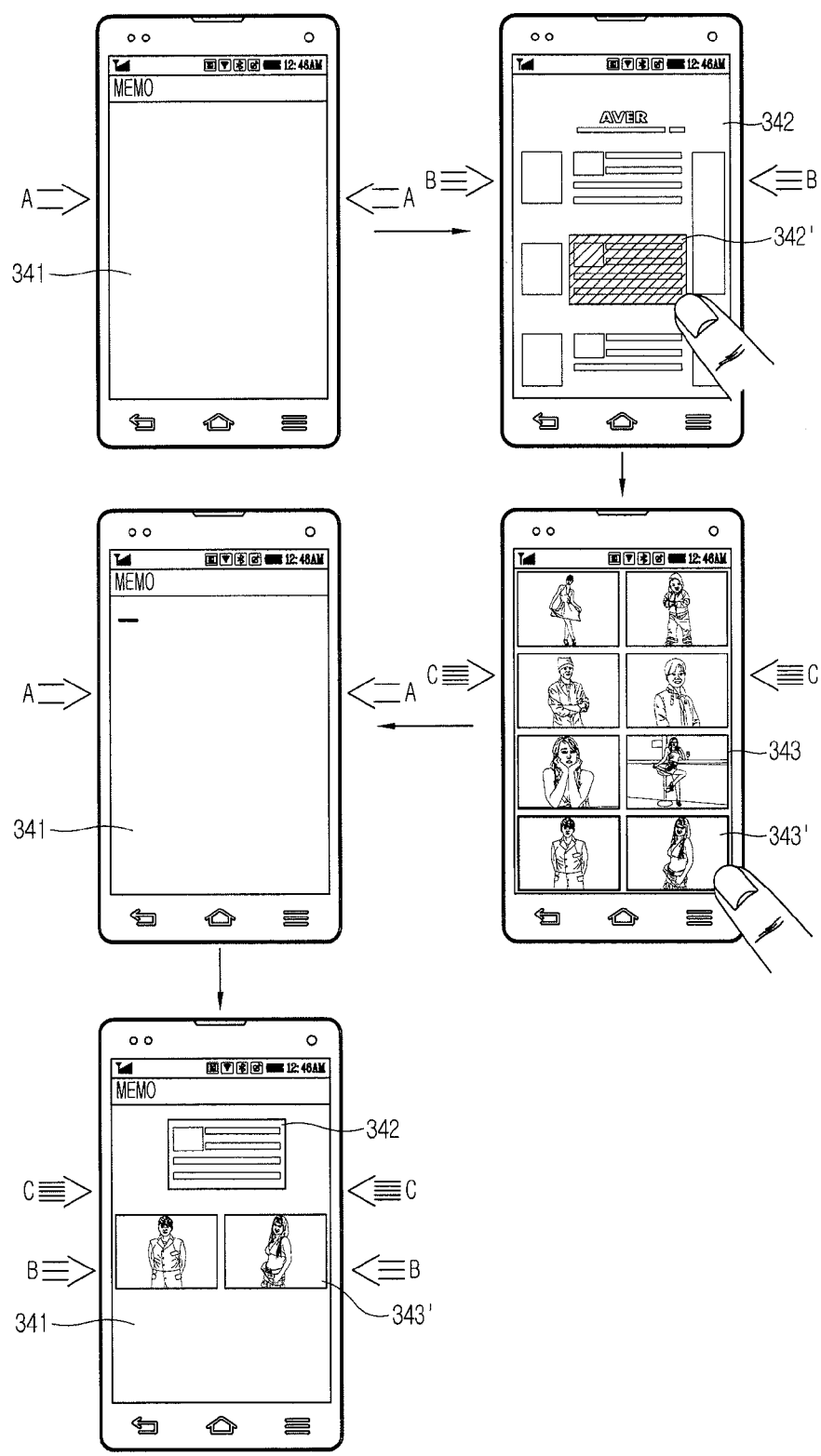

Next, FIGS. 12A through 12C are conceptual views illustrating a control method of information displayed on the display unit according to a squeeze operation based on a different pressure. In particular, FIG. 12A illustrates a control method of storing and reactivating different screen information and activated application by a squeeze operation due to a different pressure.

As show, the controller 180 controls the display unit to switch the first screen information 351 to second screen information 352 by applying a specific control command. Furthermore, the termination of an application corresponding to the first screen information 351 is limited based on the first pressure (A) applied to the body provided with a display unit for displaying the first screen information 351. Furthermore, the controller 180 controls the mobile terminal to memorize the first screen information 351.

The controller 180 also controls the display unit to switch the second screen information 352 to third screen information 353 based on a specific control command on the display unit for displaying the second screen information 352. Further, the controller 180 controls the mobile terminal to limit the termination of an application corresponding to the second screen information 352 and memorize the second screen information 352 based on the second pressure (B) applied to the body provided with a display unit for displaying the second screen information 352.

The controller 180 then controls the mobile terminal to activate an application corresponding to the second screen information 352, and controls the display unit to display the second screen information 352 based on the second pressure (B) applied to the body provided with the display unit for displaying the third screen information 353.

Furthermore, the controller 180 controls the mobile terminal to activate an application corresponding to the first screen information 351, and controls the display unit to display the first screen information 351 based on the first pressure (A) applied to the body provided with the display unit for displaying the second screen information 352 or third screen information 353.

In other words, the controller 180 controls the mobile terminal to memorize the information of the application for which termination has been limited by the squeeze operation and activate the application again when the squeeze operation is applied. Accordingly, the user can conveniently reactivate a plurality of applications without terminating them.

Next, a control method for editing screen information based on a squeeze operation will be described with reference to FIG. 12B. In particular, FIG. 12B(a) is a view illustrating the display unit for displaying first screen information 361. For example, the first screen information 361 may be a text screen containing text. Even when a control command for implementing another application is applied to the mobile terminal based on the first pressure (A) applied to the body provided with the display unit for displaying the first screen information 361, the termination of the first application using the first screen information 361 as an execution screen is limited.

The controller 180 controls the display unit to switch the first screen information 361 to second screen information 362 which is an execution screen of the second application based on a control command for implementing the second application different from the first application. For example, the second application may correspond to a dictionary application or the like, and the second screen information 362 may include a search result for which text "APPLE" has been retrieved.

The controller 180 then controls the display unit to specify an edit region 362' of the second screen information 362 based on the user's touch input. The second screen information 362 may include at least one content, and the user may select an edit region 362' containing part of the content.

Furthermore, the controller 180 can control the display unit to allow the edit region 362' to be processed in a highlighted manner when the edit region 362' is specified. The controller 180 senses a squeeze operation according to the second pressure (B) applied to the body of the mobile terminal in a state that the edit region 362' is specified. The controller 180 also controls the memory 160 to store the information of the edit region 362' based on the squeeze operation.

Further, the controller 180 may control the display unit to terminate the second application, and implement a third application different from the second application, and display third screen information 363 which is an execution screen of the third application based on the user's control command. For example, the third application may be a memo application capable of writing information such as text, images, and the like.

The controller 180 may control the display unit to input the edit region 362' on the third screen information 363 based on the second pressure (B) applied to the body provided with the display unit for displaying the third screen information 363. In other words, a squeeze operation according to the second pressure (B) applied to the body generates a control command for displaying information that has been stored therein on the display unit.

In other words, the controller 180 can control the display unit to know the kind of the activated third application and display the edit region 362' based on the squeeze operation. For example, when the input of the information of the third application is limited, the controller 180 controls the display unit to limit the output of the edit region 362' even when the squeeze operation is sensed. In this instance, the controller 180 can control the mobile terminal to ignore the squeeze operation or generate another control command.

For example, the controller 180 can control the display unit to display information corresponding to the edit region 362' in the form of a popup window or display information contained in the edit region 362' to be overlapped with the relevant screen information by switching it to a quick memo mode capable of the output of information to be overlapped with screen information currently being displayed on the display unit.

Furthermore, the controller 180 can control the display unit to know the kind of information contained in the edit region 362' and display it in one region of the third screen information 363, respectively. As illustrated in the drawing, information contained in the edit region 362' is formed with images and text. When the third screen information 363 is partitioned into a region in which images are displayed and a region in which text are displayed, the controller 180 can control the display unit to know the kind of each information and display it in the corresponding region.

On the other hand, even when a different control command is required to display a different kind of information on the third screen information 363, the controller 180 can control the display unit to directly display each information without the control command based on the squeeze operation. For example, it may correspond to when a touch input applied to a preset graphic image is required to display an image on the third screen information 363 and another touch input is required to enter text (for example, a touch input applied to a qwerty keyboard). In this instance, the controller 180 can control the display unit to display each information contained in the edit region 362' in a region corresponding to each kind of information without the touch input.

For example, when text corresponding to a phone number is contained in the edit region 362' and screen information displayed on the display unit is a message send screen, the controller 180 can control the display unit to display information corresponding to the phone number of the edit region 362' on a phone number input window of the message send screen. The controller 180 can also determine text for a phone number by whether or not a combination of numerals and "-" is contained therein.

Furthermore, when the kind of information that can be entered on the third screen information 363 is limited, for example, when only text can be entered on the third screen information 363, the controller 180 can control the display unit to display only text on the third screen information 363 and limit the output of the image or switch to a quick memo mode to display the image.

On the other hand, referring to FIG. 12B(d), the controller 180 controls the display unit to activate the first application and display first screen information based on the first pressure (A) applied to the body.

According to the present embodiment, it is possible to edit information displayed on the display unit and activate the initial application again by a squeeze operation, and thus it is useful when the user needs instant writing.

A control method for editing a plurality of information contained in different screen information will be described with reference to FIG. 12C. Even when a control command is applied to the mobile terminal based on the first pressure (A) applied to the body provided with the display unit for displaying first screen information, the termination of an application corresponding to the first screen information is limited.

In particular, the controller 180 controls the display unit to display the second screen information 342 based on a control command applied to the mobile terminal. The second screen information 342 may be a web browsing screen. Then, the controller 180 specifies a first edit region 342' contained in the second screen information 342 based on the user's touch input applied to the display unit. The controller 180 controls the memory 160 to store the first edit region 342' based on the second pressure (B) applied to the body when the first edit region 342' is specified.

On the other hand, the controller 180 controls the display unit to switch the second screen information 342 to third screen information 343 based on the user's control command. The third screen information 343 may correspond to an execution screen of a gallery application containing a plurality of images.

The controller 180 may store at least one image based on the user's touch input applied to the display unit. The at least one image is defined as a second edit region 343'. The controller 180 then controls the memory 160 to store the second edit region 343' based on a third pressure (C) applied to the body when the second edit region 343' is specified, which is different from the first and the second pressure (A, B).

The controller 180 also controls the display unit to display the first screen information 341 based on the first pressure (A) applied to the body. Furthermore, the controller 180 controls the display unit to display the first edit region 342' based on the second pressure (B) applied to the body when the first screen information 341 is displayed. Furthermore, the controller 180 controls the display unit to display the second edit region 343' based on the third pressure (C) applied to the body.

The second and the third pressure (B, C) have no sequential relation with each other, and the controller 180 controls the display unit to display an edit region corresponding thereto according to the level of the applied pressure. In addition, when the first through third pressures (A, B, C) are consecutively applied to the body, or all pressures applied to the body are released, the controller 180 controls the display unit to display the first and the second edit region (342', 343') that have been stored therein.

Accordingly, the user can store and display a plurality of information contained in a different screen information, respectively, based on a squeeze operation with a different level of pressure.

As described above, when an edit region is stored by a squeeze operation with a different level of pressure, the present invention includes various control methods for displaying it on the display unit. Hereinafter, various methods of displaying an edit region displayed by a squeeze operation will be described.

In particular, FIGS. 13A through 13D are conceptual views illustrating a method of displaying an edit region according to various embodiments. A control method for storing an edit region is similar to that as described in FIGS. 12A through 12C, and thus the same reference numerals will be designated to the same configuration and the redundant description thereof will be omitted.

Figure 13A:
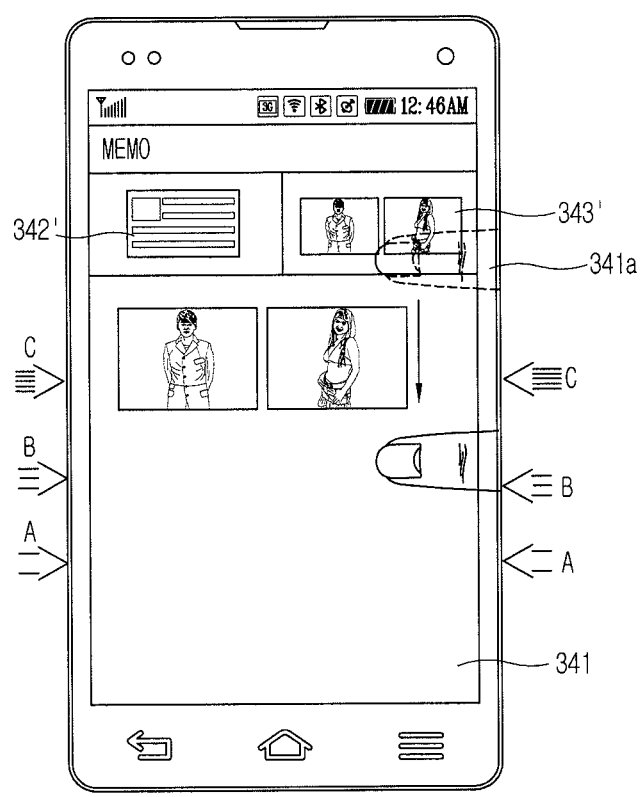
FIGS. 13A through 13D are conceptual views illustrating a method of displaying an edit region according to various embodiments.

Referring to FIG. 13A, when the first through third pressures (A, B, C) are applied, the controller 180 controls the display unit to display the first and the second edit regions 342', 343' on the first screen information 341. When the first through third pressures (A, B, C) are consecutively applied to the body, the controller 180 controls the display unit to display the first and the second edit region 342', 343' on the first screen information 341 if all the pressures are released.

Further, the first and the second edit region 342', 343' are formed on a thumbnail view window 341a. The shape of the thumbnail view window 341a denotes information contained in the first and the second edit region 342', 343' being arranged in a reduced form. The thumbnail view window 341a may be displayed in one region of the first screen information 341, and there is no limit in the location of the thumbnail view window 341a being displayed.

In other words, a plurality of edit regions stored therein are displayed for the user to take a look at them without being overlapped with one another.

Furthermore, the controller 180 controls the display unit to display information contained in the first and the second edit region 342', 343' on the first screen information 341 based on a touch input applied to one region of the display unit for displaying any one information of the thumbnail view window 341a.

Figure 13B:
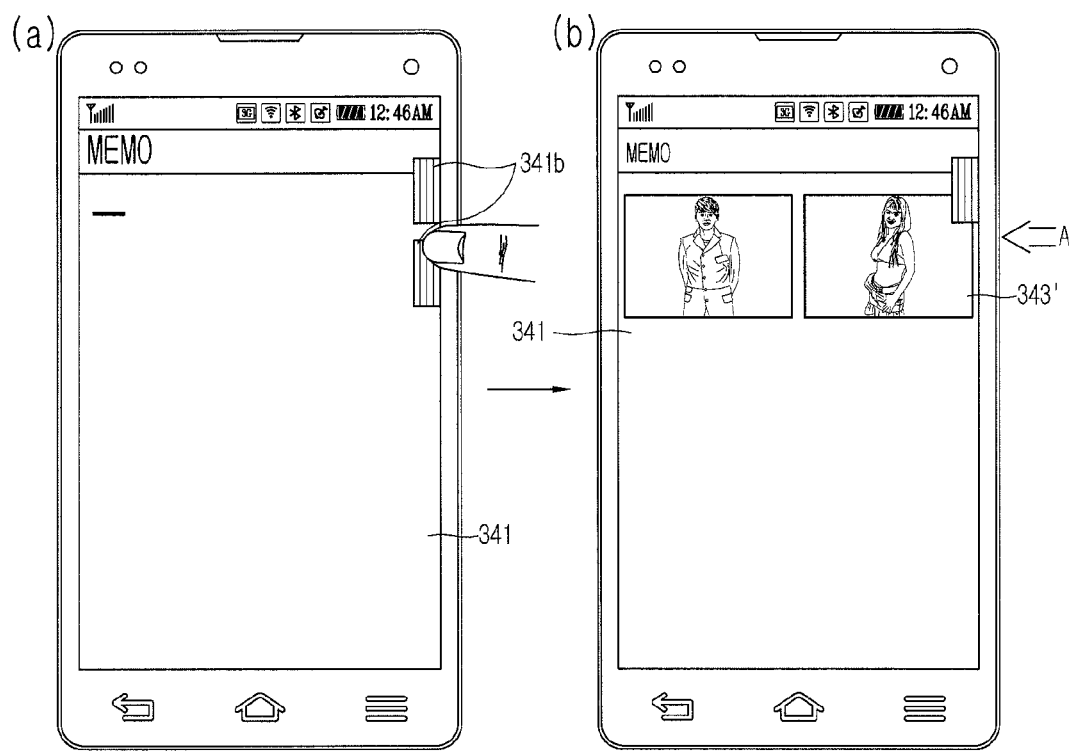

Referring to FIG. 13B, when the first through third pressures (A, B, C) are applied, the controller 180 controls the display unit to display a plurality of display units 341b corresponding to the first and the second edit region 342', 343', respectively on the first screen information 341. The number of display units 341b are formed to correspond to the number of edit regions stored therein. The display units 341b may be preferably formed at an edge region of the display unit.

When the user's touch input is applied to one region of the display unit 341b, the controller 180 controls the display unit to display the information of an edit region corresponding to the display unit 341b to which the touch input is applied on the first screen information 341.

According to the present embodiment, when there are a plurality of edit regions stored therein based on a squeeze operation, an edit region may be displayed without hiding the first screen information, and the information of the edit region may be selectively displayed by the user's touch input.

Figure 13C:
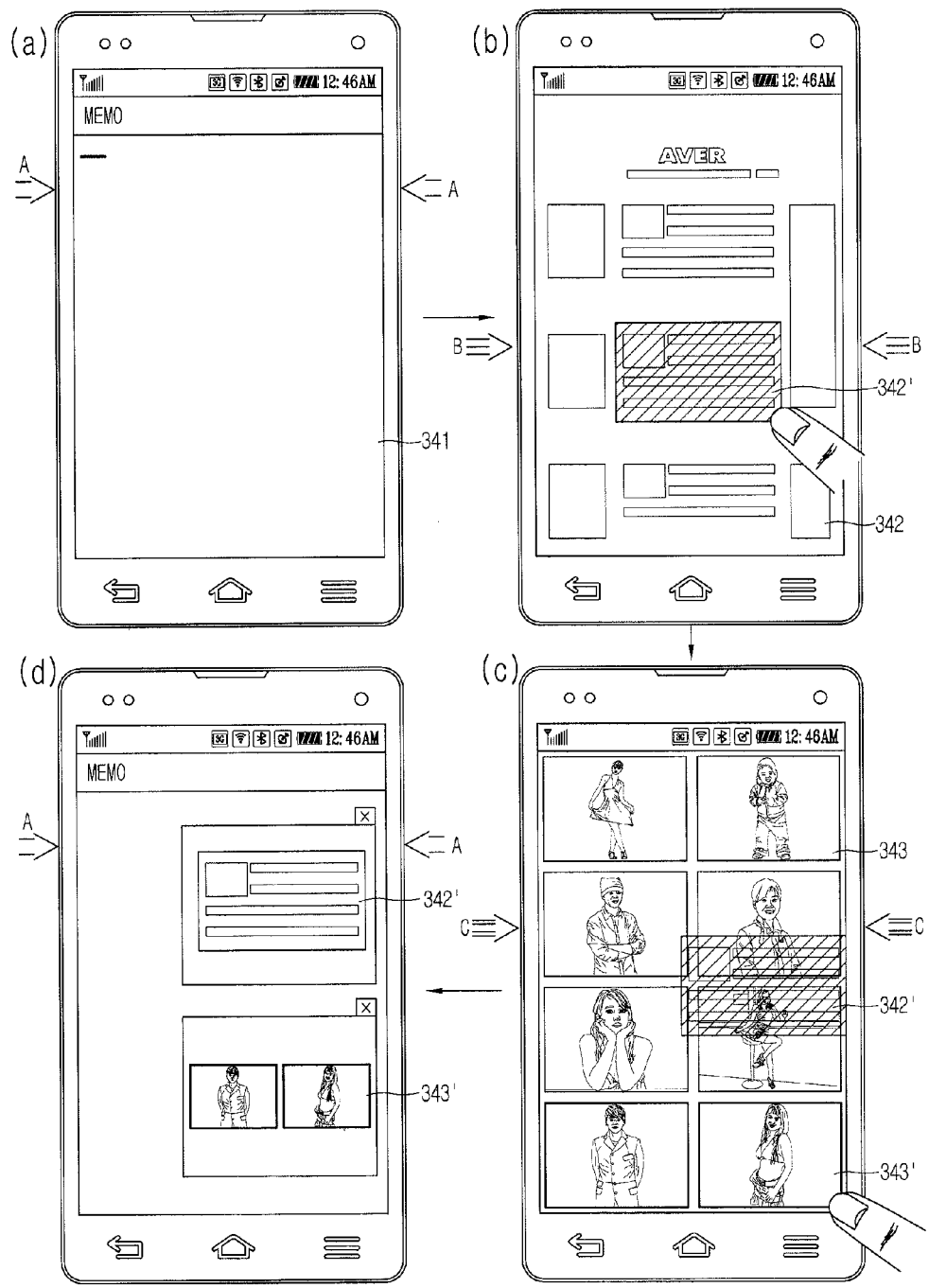

Referring to FIG. 13C, the controller 180 controls the display unit to display the information of the edit region stored based on the squeeze operation on a popup window displayed to be overlapped with other screen information. In particular, referring to FIGS. 13C(b) and 13C(c), when the first edit region 342' on the second screen information 342 is stored, the controller 180 controls the display unit to display a popup window for displaying the information of the first edit region 342' on the third screen information 343. The popup window may be displayed in a transparent form to display the third screen information 343 at the same time.

Furthermore, when the second edit region 343' of the third screen information 343 is stored, the controller 180 controls the display unit to display a popup window for displaying the first edit region 342' and the second edit region 343', respectively, on the first screen information 341. Moreover, the controller 180 may control the display unit to display information displayed on the popup window on the first screen information 341 based on a touch input applied to one region of the display unit for displaying the popup window.

Accordingly, the user can check information stored therein in real time, and display information contained therein on the screen information.

Figure 13D:
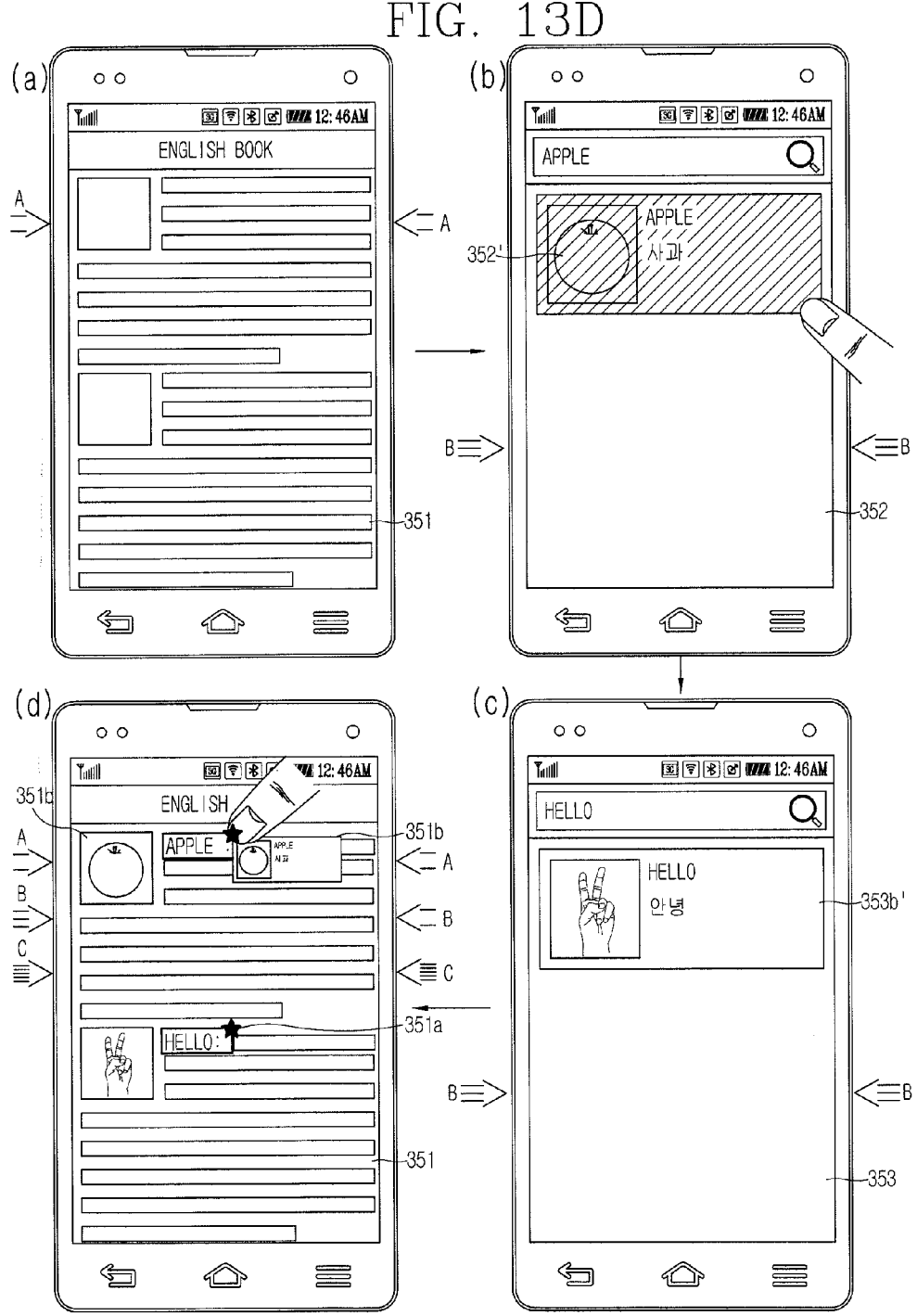

A control method for displaying the information of the edit region to be adjacent to the information associated with the first screen information will be described with reference to FIG. 13D. In particular, FIG. 13D(a) is a view illustrating the first screen information 351 containing text. When the first pressure (A) is applied to the body provided with the display unit for displaying the first screen information 351, the termination of the application of the first screen information 351 is limited.

For example, the controller 180 controls the display unit to switch to the second screen information 352 based on the user's control command, and the second screen information 352 may correspond to a search screen for which the meaning of "apple" has been retrieved from the text contained in the first screen information 351.

Further, the controller 180 controls the memory 160 to store a first edit region 352' of the second screen information 352 based on the user's touch input and the second pressure (B) applied to the body.

Furthermore, the controller 180 controls the display unit to switch to the third screen information 353 based on the user's control command, and the third screen information 353 may correspond to a search screen for which the meaning of "hello" has been retrieved from the text contained in the first screen information 351.

In addition, the controller 180 controls the memory 160 to store a second edit region 353' of the third screen information 353 based on the user's touch input and the third pressure (C) applied to the body. When the first through third pressures (A, B, C) are applied to the body (or consecutively applied pressures are released), the controller 180 controls the display unit to display information contained in the first and the second edit region 352', 353' on the first screen information 351.

However, the controller 180 displays a display image 351a to be adjacent to the information of the first screen information 351 associated with information contained in the first and the second edit region 352', 353'. The controller 180 also controls the display unit to display information contained in the first and the second edit region 352', 353' in the form of a popup window 351b based on the user's touch input applied to the display image 351a.

For example, the controller 180 controls the display unit to display the display image 351a to be adjacent to text "apple" displayed on the first screen information 351, and display the information of the first edit region 352' on a popup window 351b based on a touch input applied to the display image 351a. Accordingly, the user can view information associated with screen information in more convenient manner.

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
a wireless communication unit configured to wirelessly communicate with at least one other terminal;

a body provided with a front surface, a rear surface and a lateral surface;

a display unit disposed on at least the front surface and configured to display screen information;

a squeeze sensing unit configured to sense a pressure applied to the body to detect a squeeze operation; and a controller configured to:

receive a control command for controlling a preset first operation of the mobile terminal, perform the first preset operation based on receiving only the control command and not detecting the squeeze operation, and perform a second preset operation different than the first preset operation based on receiving both the received control command and the detected squeeze operation, wherein when the controller detects only the squeeze operation and does not receive the control command, the controller is further configured to:

store the screen information, detect the squeeze operation has been released, display a home screen, receive another control command selecting contents displayed on the home screen, display new screen information corresponding to results of said another control command, detect another squeeze operation, and display the stored screen information.

2. The mobile terminal of claim 1, wherein the first preset operation corresponds to selecting content displayed on the screen information and the second preset operation corresponds to scrolling the screen information.

3. The mobile terminal of claim 1, wherein the first preset operation corresponds to selecting content displayed on the screen information and the second preset operation corresponds to displaying new screen information.

4. The mobile terminal of claim 1, wherein the first preset operation corresponds to selecting a link displayed on the screen information and the second preset operation corresponds to scrolling the screen information.

5. The mobile terminal of claim 1, wherein the controller displays the stored screen information when the squeeze operation has been released.

6. The mobile terminal of claim 1, wherein the squeeze sensing unit is further configured to sense a level of the pressure applied to the body, and wherein the controller is further to execute different operations on the mobile terminal according to the sensed level of the pressure.

7. The mobile terminal of claim 6, wherein the controller is further configured to scroll through the screen information at different speeds based on a touch operation on the display unit and the sensed level of the pressure.

8. The mobile terminal of claim 6, wherein the screen information includes at least one content, and wherein the controller is further configured to display different parts of the content based on a preset criteria according to the sensed level of the pressure.

9. The mobile terminal of claim 6, wherein the controller is further configured to terminate an application being executed when a preset pressure is sensed on the body.

10. The mobile terminal of claim 6, further comprising:

a memory configured to store at least first screen information corresponding to a first pressure applied to the body and second screen information corresponding to a second pressure applied to the body, wherein the controller is further configured to display the first screen information when the first pressure is sensed and to display the second screen information when the second pressure is sensed.

11. The mobile terminal of claim 10, wherein when the squeeze operation is detected when a touch input selecting one region of the first screen information is applied, the controller is further configured to store in the memory the touched one region of the first screen information.

12. The mobile terminal of claim 11, wherein when the squeeze operation is detected again when the second screen information is displayed, the controller is further configured to display the stored one region of the first screen information to be overlapped with the second screen information.

13. A method of controlling a mobile terminal, the method comprising:

allowing, via a wireless communication unit, wireless communication with at least one other terminal;

displaying, via a display unit disposed on at least a front surface of the mobile terminal, screen information;

sensing, via a squeeze sensing unit, a pressure applied to a body of the mobile terminal, to detect a squeeze operation;

receiving, via a controller, a control command for controlling a preset first operation of the mobile terminal;

performing, via the controller, the first preset operation based on receiving only the control command and not detecting the squeeze operation; and performing, via the controller, a second preset operation different than the first preset operation based on receiving both the received control command and the detected squeeze operation, wherein when the sensing step detects only the squeeze operation and the receiving step does not receive the control command, the method further comprises:

storing, via a memory, the screen information;

detecting, via the controller, the squeeze operation has been released;

displaying, via the display unit, a home screen;

receiving, via the controller, another control command selecting contents displayed on the home screen;

displaying, via the display unit, new screen information corresponding to results of said another control command;

detecting, via the squeeze sensing unit, another squeeze operation; and displaying, via the display unit, the stored screen information.

14. The method of claim 13, wherein the first preset operation corresponds to selecting content displayed on the screen information and the second preset operation corresponds to scrolling the screen information.

15. The method of claim 13, wherein the first preset operation corresponds to selecting content displayed on the screen information and the second preset operation corresponds to displaying new screen information.

16. The method of claim 13, wherein the first preset operation corresponds to selecting a link displayed in the screen information and the second preset operation corresponds to scrolling the screen information.

17. The method of claim 13, further comprising:

displaying the stored screen information when the squeeze operation has been released.

18. The method of claim 13, wherein the sensing step further comprises sensing a level of the pressure applied to the body, and wherein the method further comprises executing different operations on the mobile terminal according to the detected level of the pressure.

\* \* \* \* \*